US010402159B1

(12) United States Patent
Darrah et al.

(10) Patent No.: US 10,402,159 B1
(45) Date of Patent: Sep. 3, 2019

(54) AUDIBLE USER INTERFACE SYSTEM

(71) Applicant: AMAZON TECHNOLOGIES, INC., Seattle, WA (US)

(72) Inventors: Lawrence Edward Darrah, Seattle, WA (US); Jason Gabor Troxel, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 765 days.

(21) Appl. No.: 14/657,056

(22) Filed: Mar. 13, 2015

(51) Int. Cl.
*G06F 3/16* (2006.01)
*G06F 3/0484* (2013.01)
*G06F 16/957* (2019.01)

(52) U.S. Cl.
CPC .......... *G06F 3/167* (2013.01); *G06F 3/04842* (2013.01); *G06F 16/957* (2019.01)

(58) Field of Classification Search
CPC .. G09B 21/005; G09B 21/003; G09B 21/006; G09B 21/008; G09B 21/007; G09B 5/00; G09B 5/125; G09B 19/00; G09B 19/04; G09B 21/001; G09B 21/004; G09B 17/003; G09B 17/006; G09B 19/06; G09B 21/00; G09B 21/009; G06F 3/167; G06F 3/04842; G06F 17/30899
See application file for complete search history.

(56) References Cited

U.S. PATENT DOCUMENTS

| 5,461,399 | A | * | 10/1995 | Cragun | G06F 3/011 340/4.13 |
| 6,064,387 | A | * | 5/2000 | Canaday | G06F 3/04812 345/159 |
| 6,912,500 | B2 | * | 6/2005 | Hickey | G11B 19/025 704/270 |
| 8,949,746 | B2 | * | 2/2015 | Marzke | G06F 3/0488 235/379 |
| 2002/0138264 | A1 | * | 9/2002 | Janakiraman | G06F 3/016 704/235 |
| 2004/0180316 | A1 | * | 9/2004 | Yang | G09B 17/00 434/317 |

(Continued)

OTHER PUBLICATIONS

Al-Subaihin, A.A., Al-Khalifa, A.S. and Al-Khalifa, H.S., Aug. 2013, Accessibility of Mobile Web Apps by Screen Readers of Touch-Based Mobile Phones. In Mobile Web Information Systems: MobiWIS 2013, International Workshops, Paphos, Cyprus, Aug. 26-28, Revised Selected Papers (vol. 183, p. 35). Springer.*

*Primary Examiner* — Andrea N Long
(74) *Attorney, Agent, or Firm* — Lindauer Law, PLLC

(57) ABSTRACT

Described are techniques for enabling pointer devices to be used by users with vision impairment to interact with rendered content. Sounds may be output to a user to indicate the presence of one or more features within rendered content. Characteristics of the sounds may be used to indicate the position of the features within a user interface, the distance between the features and a pointer associated with a pointer device, and the direction of the features relative to the pointer. Sounds may also be used to indicate the type or size of rendered content. Responsive to the sounds, a user with impaired vision may manipulate the pointer device to reposition the pointer. Additional or modified sounds may be provided to the user based on the subsequent position of the pointer.

20 Claims, 9 Drawing Sheets

(56) References Cited

U.S. PATENT DOCUMENTS

| | | | |
|---|---|---|---|
| 2005/0233287 A1* | 10/2005 | Bulatov | G09B 21/006 434/114 |
| 2010/0070872 A1* | 3/2010 | Trujillo | G06F 3/04892 715/745 |
| 2011/0154212 A1* | 6/2011 | Gharpure | G06F 17/30867 715/738 |
| 2012/0030625 A1* | 2/2012 | Miyazaki | G06F 3/0488 715/830 |
| 2014/0075298 A1* | 3/2014 | Kraft | G09B 21/00 715/255 |
| 2014/0149868 A1* | 5/2014 | Dubey | G06F 3/0485 715/727 |
| 2014/0188479 A1* | 7/2014 | Bellamy | G10L 13/033 704/260 |
| 2016/0162179 A1* | 6/2016 | Annett | G06F 3/0488 715/709 |

\* cited by examiner

US 10,402,159 B1

AUDIBLE USER INTERFACE SYSTEM

BACKGROUND

Users of a computing device having impaired vision are often unable to effectively utilize a pointer device or other types of input devices normally used to maneuver a cursor within a display area of a computing device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
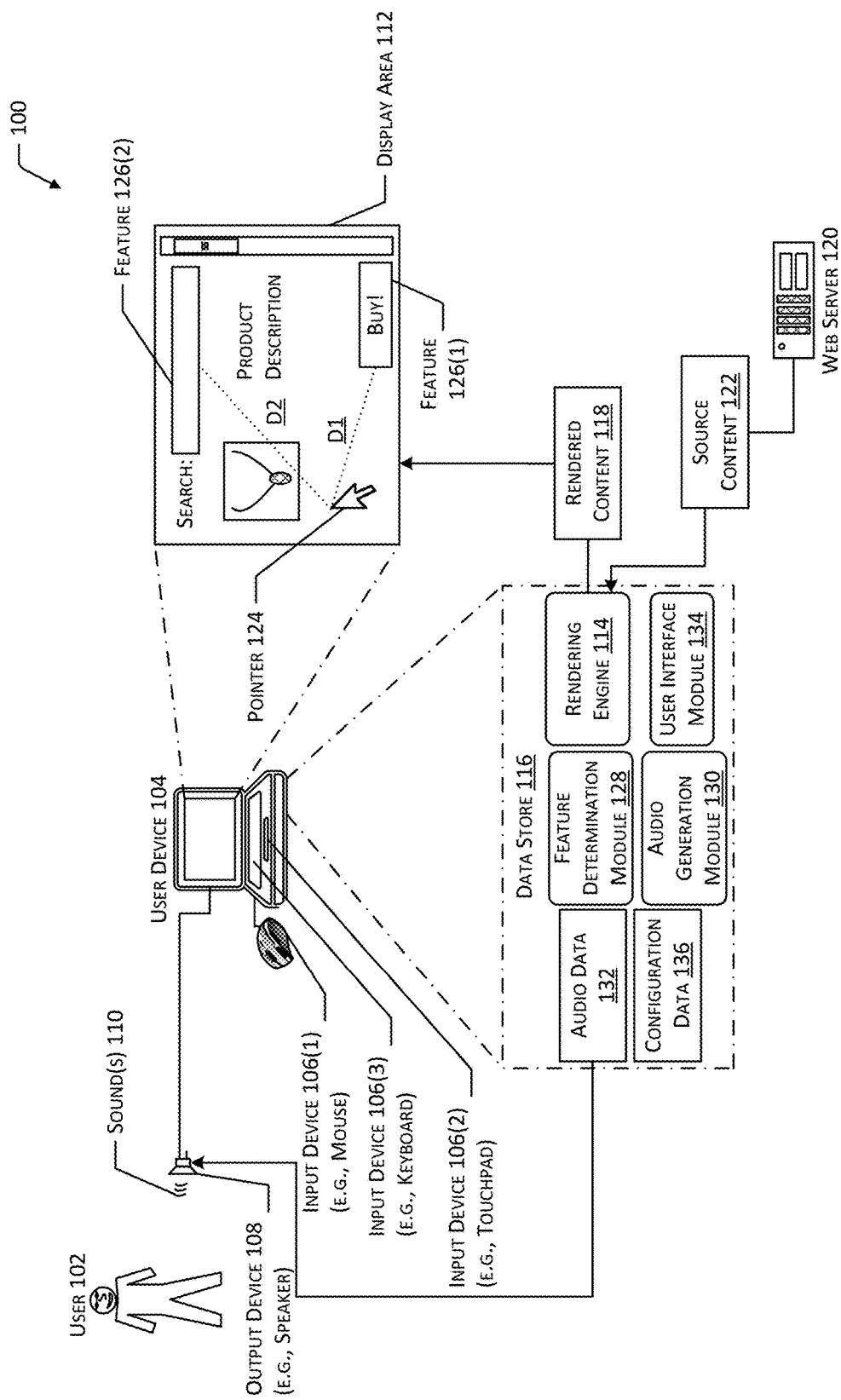
FIG. 1 depicts a system for providing audio output to a user based on one or more features determined from rendered content.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

A visually impaired user of a computing device may use a screen reader to identify and interpret displayed text and generate speech corresponding to the text. Screen reading software may also output audible speech that describes graphical elements or communicates other information that may be encoded within rendered content. Rendered content may include content provided by a web server and rendered by a rendering engine for presentation to a user. Screen reading software may include Job Access With Speech (JAWS) created by Freedom Scientific, Inc. of St. Petersburg, Fla., USA; NonVisual Desktop Access (NVDA) created by NV Access of Ferny Grove, Queensland, Australia; Microsoft Narrator created by Microsoft Corp. of Redmond, Wash., USA, and so forth. Through use of keyboard presses or other inputs, the user may navigate between sections of a webpage or other content, listen to speech corresponding to the content that is currently displayed, and then interact with that content or navigate to other content. Interaction with rendered content in this manner may be less efficient than conventional methods due to the fact that a user must typically navigate through individual sections of the content, one at a time, listening to a sufficient quantity of speech for each section to determine whether to navigate to the subsequent section. Pointer devices, such as mouse devices or other types of input devices, used to move a pointer, such as a visible cursor, within a display area may permit more direct and efficient interaction with and navigation of content. For example, a mouse device may be used to directly select a displayed feature or section of the content. However, because pointer devices rely on movement of a visible cursor, they are not readily accessible to users with vision impairment.

Described in this disclosure are techniques for enabling users with impaired vision to effectively use input devices configured to move a pointer within a display area by providing audible feedback to the user(s). The audible feedback may include one or more sounds that indicate features of rendered content, such as a type or category associated with the content, a length of the content, or the presence of certain features within the content, such as particular text, buttons, menus, search bars, and so forth. Sounds may also be provided based on the position of a pointer relative to one or more features within the content, the beginning or end of the content, or the edges of the display area. In some implementations, the audible feedback may be used in conjunction with a screen reader to augment the accessibility provided by the screen reader. For example, audible feedback may be used to enable a user to maneuver a pointer into association with a feature of a rendered website, responsive to which the screen reader may output speech indicative of the feature associated with the pointer. As another example, audible feedback may be used to enable a user to determine a number of pages remaining in a chapter of an electronic book, while the screen reader outputs speech corresponding to the text of the book. The volume and frequency of the audible feedback may be configured to minimize interference with the speech output by the screen reader.

Audible feedback may include any manner of sound, such as a tone having a selected frequency, a musical note, a recorded sound (e.g., a WAV file, a MPEG file, and so forth), a series of tones or sounds, and so forth. For example, when a webpage having a particular link or button is rendered, a user may be provided with a first tone, followed by a second tone after passage of an interval of time. The length of the interval of time may correspond to the distance between a pointer associated with a mouse device and the particular link or button. In other implementations, other characteristics of a sound may be altered to indicate the distance between a pointer and a link or button, a direction of the link or button relative to the pointer, and so forth. For example, the frequency, amplitude, or duration of a sound may be modified based on the distance between a feature and a pointer or the direction of the feature relative to the pointer. Different tones or other types of sounds may be used to indicate the other features on the webpage. Tones, notes, and other sounds may also be used to indicate a type or category associated with the webpage, the length of the webpage, and so forth. One or more of the emitted sounds may be provided with a volume less than that of speech produced by accompanying screen reader software to avoid interfering with the ability of a user to hear the speech indicative of the rendered content.

In some implementations, the sounds that are output and the characteristics of the sounds may be determined based on one or more environmental factors associated with a user device. For example, sensors associated with a user device may determine ambient noise, temperature, motion, and so forth. Properties of emitted sounds, such as the frequency, wavelength, amplitude, direction, and so forth, may be modified based on determined environmental factors. Continuing the example, sounds emitted by a user device may be provided with a volume greater than that of ambient noise or with a frequency that differs from that of the ambient noise to facilitate distinguishing the emitted sounds. As another example, sensors associated with a user device may detect speech, such as the user's voice. Sounds emitted by the user device may be provided with a lower volume responsive to determination of the user's speech. As yet another example, responsive to determination of the presence of a service animal, such as a dog, the frequency of sounds emitted by the user device may be selected to minimize upset to the animal. In some implementations, the emitted sounds may be selected to alert the animal to take an action subsequent to an event, such as the completion of an article by a user. The presence of a service animal may be determined based on user input, detection of a radio frequency identification (RFID) tag or similar object worn by the animal, determination of the presence of the animal using cameras associated with the user device, and so forth.

In some implementations, the features of rendered content responsive to which sounds are output and the particular sounds that are emitted by a speaker may be customized by a user. For example, a user may provide user input to a user device to assign a series of tones having frequencies ranging from 10 hertz (Hz) to 360 Hz to one or more types of webpages. When a particular type of webpage is rendered, a tone having the selected frequency corresponding to that webpage type may be emitted. As another example, a user may assign a tone having a frequency ranging from 600 Hz to 1200 Hz to indicate the length of a webpage. When the webpage is rendered, an interval of time corresponding to the webpage length may be determined. A first tone may be emitted, followed by a second tone after the passage of the interval of time. In other implementations, particular frequencies may be used to indicate page length using a single tone, such as a 1,200 Hz tone to indicate a short webpage and a 600 Hz tone to indicate a long webpage. Other tones may be assigned to indicate the position of a pointer relative to the left and right edges of a display area. As another example, a user may assign a 2,000 Hz tone to a particular link. The selected tone may be emitted periodically, at a rate based on the proximity of the pointer to the link. As the pointer is moved closer to the link, the rate at which the tone is repeated may increase. When the pointer reaches a position from which the link may be selected, the tone may change (e.g., in rate, frequency, amplitude, and so forth) to indicate to the user that the link may be accessed. As yet another example, if a webpage or other content is not properly rendered, a notification sound indicative of the failure to render the content may be provided to the user. In some implementations, when subsequent content is not properly rendered, the content previously presented to the user may be retained for interaction by the user. A user may also customize sounds based on environmental factors. For example, a user may select particular frequencies, volumes, or types of sounds to be emitted based on ambient noise, motion, temperature, and so forth.

In some implementations, audio data may be output to a speaker or another type of output device automatically, such as at the time when content is rendered, or periodically at selected intervals. In other implementations, audio data may be output responsive to input received by a user. For example, a user may provide input using a mouse device or another input device requesting audio feedback regarding the position of a pointer relative to one or more features. Audio feedback may be output to the user responsive to that input. As another example, a user may move a pointer device a distance that exceeds a threshold distance. Responsive to this movement, audio feedback may be output to the user based on the new position of the pointer relative to one or more features.

To facilitate a user's access to one or more features of rendered content, in some implementations, a pointer associated with an input device may be automatically positioned within a threshold distance of the feature at the time that the content is rendered. For example, when rendering a webpage for presentation to a user, the pointer associated with a mouse device may be automatically positioned over a button that will link to a subsequent page of the article when the current page of the article is rendered.

Implementations usable within the scope of the present disclosure may enable user with impaired vision to make use of input devices associated with movable pointers, such as mouse devices, trackballs, touchpads, touch sensors, joysticks, puff tubes (e.g., sip-and-puff (SNP)), head trackers, and so forth. By providing audio feedback to a user, the user may be informed of the presence or position of any number of distinct features within rendered content. The characteristics of the audio feedback may be modified as the user moves the pointer, which may guide the user toward certain desired features.

FIG. 1 depicts a system 100 for providing audio output to a user 102 based on features determined from content rendered to a user device 104. Use of audio output in lieu of or in addition to visible content may enable a user 102 with vision impairment to discern features of the content and interact with the user device 104 responsive to the audio output. While FIG. 1 depicts the user device 104 as a laptop computer, the user device 104 may include any manner of computing device such as a mobile device, smartphone, set-top box, tablet computer, personal computer, wearable computer, and so forth. In one implementation, the user device 104 may include a portable device for placement on a floor, shelf, or other surface in a room. Cameras or other sensors associated with the portable device may detect movement or the position of a user's fingers or other body parts for use as input associated with a virtual user interface. One or more speakers associated with the portable device may be used to provide output to the user 102 in the form of sound. For example, sounds may be output responsive to movement of the user's fingers (e.g., through the air), and the user 102 may further move fingers or other body parts responsive to the sounds, effectively creating an audio-based user interface.

The user 102 may provide input to the user device 104 using one or more input devices 106. The input devices 106 may include one or more mouse devices, trackballs, touchpads, touch sensors, joysticks, SNPs, head trackers, microphones, keyboards, buttons, cameras, and so forth. For example, FIG. 1 depicts a first input device 106(1) as a mouse device, a second input device 106(2) as a touchpad, and a third input device 106(3) as a keyboard. The user device 104 may also include one or more output devices 108. For example, the user device 104 may include one or more speakers that may be used to emit sounds 110 perceivable by the user 102. The speaker(s) may include monaural speakers or multi-channel (e.g., stereo, surround-sound, and so forth) speakers. In some implementations, an array of speakers may be used to control the directionality of the emitted sounds 110. For example, beamforming or other techniques may be used to provide for directionality or gain in particular directions. In other implementations, speakers used to emit sounds 110 may be associated with multiple user devices 104. For example, speakers associated with a portable user device 104, such as a smartphone, and one or more wearable devices, such as a watch or headphones, may be used to provide the sounds 110 to the user 102. The particular speaker(s) used to emit a sound 110 may be used to provide the sound 110 with a directional component or to indicate specific features of accessed content. The user device 104 may also include a display having a display area 112 in which rendered content may be visualized. However, in some implementations, content may be rendered by the user device 104 without necessarily displaying the content using a display. For example, a user device 104 lacking a display, such as a telephone, wearable device, or computer lacking a monitor or screen, may be used by a user 102 with vision impairment or by other users 102, who may interact with the content based on the sounds 110 emitted by the speaker(s). In some implementations, the output devices 108 may include one or more haptic devices. For example, one or more of the input devices 106 or other portions of the user device 104 may be provided with a haptic device that may provide a tactile signal to a user 102 touching one or more of the input devices 106 or other portions of the user device 104. The tactile signal is configured to provide a sensory input to the user 102 that may be perceived as a touch, texture, and so forth. For example, the haptic device may comprise a mass and actuator configured to generate a vibrotactile sensation to the user 102. In another example, the haptic device may include an electrical signal generator to electrically stimulate nerves in the skin of the user 102. As another example, the user 102 may touch one or more wearable haptic devices such as gloves, footpads, and so forth, associated with the user device 104, which may be used to provide tactile signals to the user 102. Haptic devices may be used in conjunction with speakers. For example, a user 102 may experience listener fatigue when presented with a large number of audible sounds 110 for a prolonged period of time. As another example, the quantity of information that may be presented at a single time using sound may be limited, such as due to limitations of a user device 104 or of the user 102. Use of haptic feedback in addition to audio feedback may enable the user 102 to reduce the quantity of audible sounds 110 used to navigate rendered content while enhancing the ability of the user 102 to interact with the content. For example, haptic feedback may be used to indicate particular features or characteristics of the content, such as a specific location or direction corresponding to a feature. Audio feedback may be used to indicate other features or characteristics, such as a distance corresponding to the feature. As another example, audio feedback may be used to indicate a first characteristic of a webpage feature, such as the distance between that feature and a pointer. Continuing the example, haptic feedback may be used to indicate the direction of the feature relative to the pointer, such as by providing a tactile sensation to one or more wearable devices contacting a user's extremities.

A rendering engine 114, stored in a data store 116 associated with the user device 104, may output rendered content 118 for presentation by the user device 104. For example, rendered content 118 may be provided to memory associated with the user device 104 for access by one or more processors. The data store 116 may include one or more computer-readable storage media (CRSM) in communication with the user device 104. For example, the data store 116 may include one or more internal, external, removable, or portable CRSM associated with the user device 104. In other implementations, the data store 116 may be associated with a server or one or more other computing devices, which may communicate with the user device 104 via one or more networks. For example, a web server 120 may provide source content 122 to the user device 104. The web server 120 may include one or more computing devices configured to process requests from user devices 104 to access websites, games, applications, and other types of data and to provide source content 122 associated with the requested data to a user device 104 for rendering. The source content 122 may comprise Hypertext Markup Language (HTML), Cascading Style Sheets (CSS), JavaScript, Java code, image files, and so forth. The rendering engine 114 may process the source content 122 to produce rendered content 118. For example, the rendering engine 114 may produce rendered content 118 that comprises a Document Object Model (DOM) that has been generated from the source content 122, vector graphics, bitmapped images, and so forth. The rendered content 118 may be presented to a user 102 using one or more of visible indicia within the display area 112, audible indicia using speakers, or tactile indicia using haptic devices. In other implementations, rendering engine 114 may be associated with the web server 120 or another computing device. The web server 120 or one or more other computing devices associated with the rendering engine 114 may produce the rendered content 118 and provide the rendered content 118 to the user device 104.

The rendered content 118 may be used to present a user interface to one or more users 102 in the display area 112 of the user device 104. As described previously, however, in some implementations, use of the display area 112 may be omitted, or a user device 104 lacking a display may be used to render content for access by one or more users 102. The rendered content 118 may then function as a virtual user interface. The user interface may include a pointer 124 associated with one or more of the input devices 106. For example, input provided to the user device 104 using a mouse device or touchpad may move the pointer 124 within the display area 112 or select one or more features 126 depicted within the display area 112. Continuing the example, the depicted user interface includes a first feature 126(1), which may include a button for purchasing a product shown or described in the display area 112. A second feature 126(2) may include a text box that may be used to input search queries to locate additional products. Other features 126 may include links, buttons, menus, scrollbars, graphics, text, the edges of the display area 112, the boundaries of the rendered content 118, and so forth.

A feature determination module 128 in the data store 116 may be used to determine the position of one or more features 126 or the pointer 124 within the user interface. For example, the feature determination module 128 may process the DOM tree provided by the rendering engine 114 to determine the placement of features 126 within the display area 112. In other implementations, the feature determination module 128 may access one or more of the rendered content 118 or the user device 104 to determine the position of the one or more features 126 or the pointer 124. Determining the position of the one or more features 126 or the pointer 124 may include determining a relative position the one or more features 126 or the pointer 124 in a two-dimensional space or three-dimensional space represented by the user interface. The determined positions of one or more features 126 or of the pointer 124 may be communicated to the user 102 via audio output, such as tones, musical notes, recorded sounds, melodies, and so forth. For example, the feature determination module 128 may determine that the pointer 124 is located a first distance D1 from the first feature 126(1). The feature determination module 128 may also determine that the pointer 124 is located a second distance D2 from the second feature 126(2). In some implementations, relative distances D of features 126 from the pointer 124 may be determined by measuring the distances D relative to a particular point associated with the pointer 124, such as the tip of an arrow. The determined distances D may be used by an audio generation module 130 in the data store 116 to determine audio output to present to users 102.

The audio generation module 130 may access audio data 132 for output to one or more speakers, based on the presence or position of the features 126 determined by the feature determination module 128 or the relative distances D of the features 126 from the pointer 124. The audio data 132 may include data corresponding to any manner of sound 110, such as tones, musical notes, waveforms, a series of tones, and so forth. The audio data 132 accessed by the audio generation module 130 may correspond to the particular features 126 determined by the feature determination module 128, the distances D between the pointer 124 and the features 126, or other characteristics of the rendered content 118. For example, the audio generation module 130 may access first audio data 132(1) corresponding to a first sound 110(1) to indicate the presence of the first feature 126(1). The audio generation module 130 may access second audio data 132(2) corresponding to a second sound 110(2) to indicate the presence of the second feature 126(2). In some implementations, the audio generation module 130 may modify one or more characteristics of the first audio data 132(1) or the second audio data 132(2) based on the distances D between the pointer 124 and one or more features 126. For example, a sound 110 corresponding to the second feature 126(2), which is farther from the pointer 124 than the first feature 126(1), may be modified by providing the sound 110 with a lower volume, a lower frequency, a longer duration, and so forth, than the sound 110 corresponding to the first feature 126(1). In some implementations, the sound 110 may include a repeating tone or other type of sound 110, and the rate of repetition of the sound 110 may correspond to the distance D between the pointer 124 and a feature 126. In other implementations, two sounds 110 corresponding to a feature 126 may be emitted, spaced apart by an interval of time that corresponds to the distance D between the pointer 124 and the feature 126.

In some implementations, the audio generation module 130 may determine an interval of time that corresponds to the first distance D1. Continuing the example, the interval of time may be determined using a formula or algorithm, such as an interval of 20 milliseconds (ms) per 10 pixels of distance between the pointer 124 and the first feature 126(1). In other implementations, the interval of time may be determined from a table stored in the data store 116 in which intervals of time are associated with distances D. The audio generation module 130 may provide first audio data 132(1) to an output device 108 to produce a first sound 110(1) that corresponds to the first feature 126(1). For example, the audio generation module 130 may provide a tone having a particular frequency. The audio generation module 130 may then determine passage of the interval of time. After passage of the interval of time, the audio generation module 130 may provide second audio data 132(2) to the output device 108 to produce a second sound 110(2). The two sounds 110 may be identical sounds 110 or different sounds 110. The audio generation module 130 may similarly determine an interval of time corresponding to the second distance D2. The audio generation module 130 may provide first audio data 132(1) that corresponds to the second feature 126(2) to produce a first sound 110(1) and then provide second audio data 132(2) to produce a second sound 110(2) subsequent to the passage of the interval of time. The intervals of time that pass between successive emissions of paired sounds 110 may inform the user 102 of the distances D between each feature 126 and the pointer 124. In some implementations, the audio data 132 may be modified with one or more audio characteristics indicative of the direction that a feature 126 is located relative to the pointer 124. For example, speakers that are part of a surround-sound system may emit sounds 110 using channels that provide the sounds 110 with a particular directionality. Continuing the example, responsive to determination of a feature 126 located on the right portion of a user interface, surround-sound channels that produce a sound 110 appearing to emanate from the right side of the user 102 may be used to emit the sound 110.

In some implementations, a user 102 may select one or more of the features 126 responsive to which particular sounds 110 are produced. A user 102 may also select particular characteristics of the features 126 to be indicated by modifying characteristics of the sounds 110. For example, a user interface module 134 may receive user input that may be stored as configuration data 136. Continuing the example, the user 102 may select one or more types of content that may be of interest to the user 102. The user 102 may also select one or more sounds 110 that may indicate the selected types of content. When rendered content 118 having a selected content type is rendered by the rendering engine 114, the audio generation module 130 may determine the audio data 132 corresponding to the sound 110 indicative of that content type and provide that audio data 132 to an output device 108.

As another example, the user 102, by providing input processed by the user interface module 134, may select one or more features 126 that may be of interest, such as a text box for inputting search queries, a button for purchasing products, one or more particular strings of text, one or more graphics, and so forth. The user 102 may also select one or more sounds 110 for indicating selected features 126. In some implementations, the user 102 may further select characteristics of the features 126, such as the position of the features 126 within a user interface (e.g., the section of a webpage where a feature 126 may be located) or the distance or direction of a feature 126 relative to a pointer 124. The user 102 may also select characteristics of the sounds 110 that may be used to indicate characteristics of the features 126. The user interface module 134 may receive and process each selection provided by a user 102 and generate configuration data 136 based on the user input. For example, a user 102 may select a repeating tone to indicate the distance D between a pointer 124 and a feature 126, in which the rate of repetition of the tone changes based on the distance D. As another example, a user 102 may select tones having different frequencies or amplitudes based on the zone of a user interface or display area 112 within which a feature 126 is located or the direction in which a feature 126 is located relative to the pointer 124. Continuing the example, the user 102 may input characteristics of tones, such as frequencies, durations, or amplitudes, or the user 102 may select one or more tones from a list or menu. As yet another example, a user 102 may select characteristics of a sound 110 that may vary based on distance D, such as the amplitude of a sound 110. Sounds 110 that correspond to features 126 that are a greater distance D from a pointer 124 may be emitted at a lesser amplitude than sounds 110 corresponding to features 126 that are closer to the pointer 124. The user 102 may provide input to be processed by the user interface module 134 using one or more input devices 106. For example, the user interface module 134 may maintain data regarding the position of the pointer 124 within the location of the user interface, such as a set of coordinates corresponding to the position.

Figure 2:
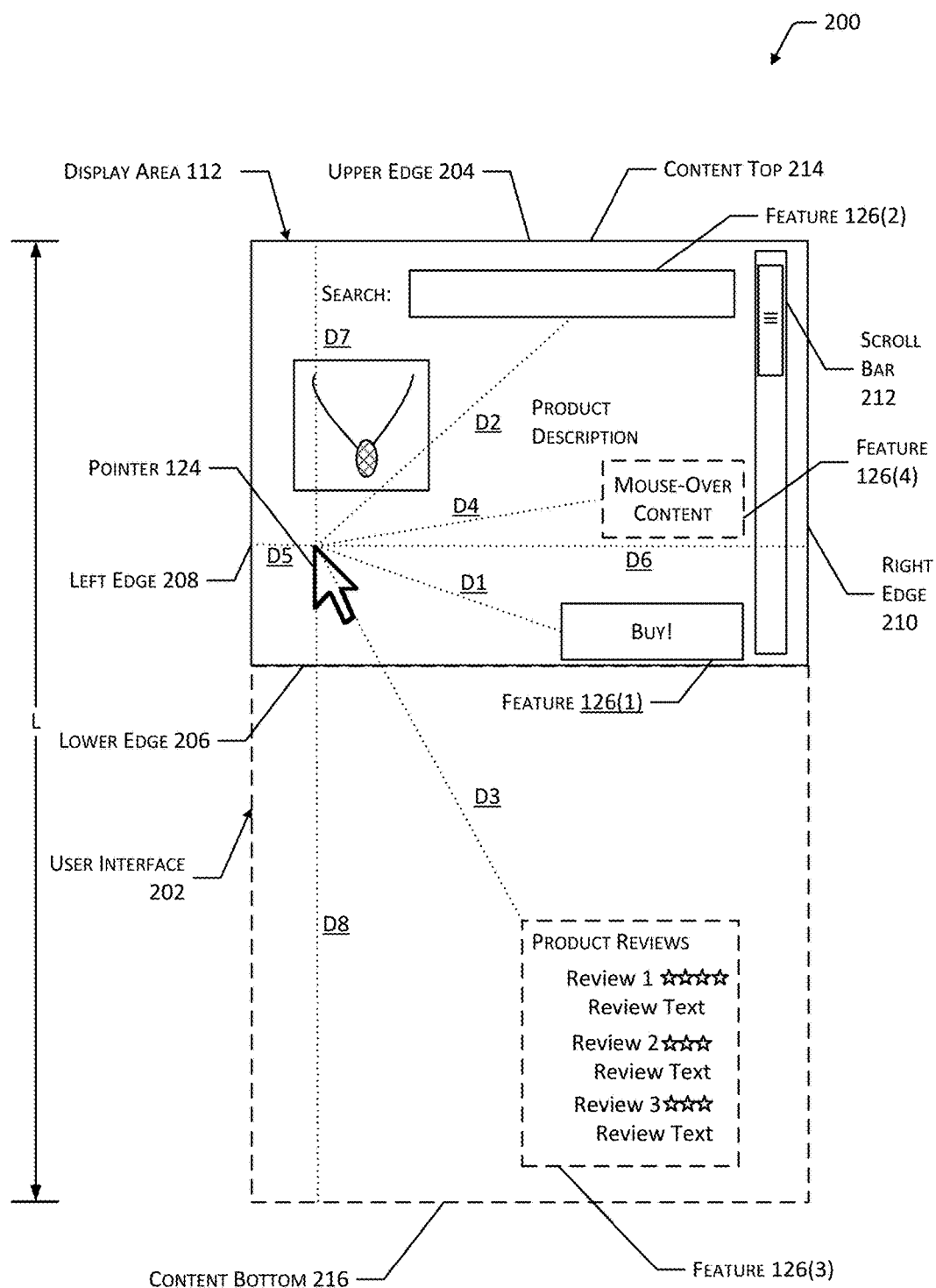
FIG. 2 depicts a diagram illustrating an example of rendered content and a user interface usable within the scope of the present disclosure.

FIG. 2 depicts a diagram 200 illustrating an example of rendered content 118 and a user interface 202 usable within the scope of the present disclosure. The display area 112 may present at least a portion of the rendered content 118. However, in some implementations, the display area 112 may remain unused, or a user device 104 lacking a display may be used. The display area 112 is bounded by an upper edge 204, a lower edge 206, a left edge 208, and a right edge 210. The display area 112 may not necessarily contain the entirety of the rendered content 118 presented in the user interface 202. In some implementations, audio output may be provided to a user 102 with regard to portions of the user interface 202 not presented in the display area 112, and a user 102 may interact with portions of the user interface 202 not presented in the display area 112. For example, a user 102 may manipulate a pointer 124 associated with an input device 106 to indicate portions of the user interface 202 outside of the display area 112.

One or more input devices 106, such as a mouse device, touchpad, trackball, joystick, touch sensor, SNP, head tracker, and so forth, may be used to move a pointer 124 within the display area 112. In some implementations, the pointer 124 may include a visible cursor depicted within the display area 112. In other implementations, the pointer 124 may not be visible. For example, the pointer 124 may simply include a point or group of points within a user interface 202 that is currently indicated or selected by an input device 106. Continuing the example, a head tracker or a camera may be used to determine one or more points within a display area 112 indicated by a user 102 without necessarily generating a visible cursor. As another example, a user 102 may contact or provide a near-touch to a touchscreen to indicate one or more points displayed to the user 102 without generating a visible cursor. In implementations where the display area 112 is not used or where no display device is present, visible cursors would not be generated by any input device 106.

As described previously, in some implementations, the rendered content 118 may exceed the boundaries of the display area 112. For example, FIG. 2 depicts a portion of the rendered content 118 extending below the lower edge 206 of the display area 112. In other implementations, the rendered content 118 may extend beyond other edges of the display area 112. The portion of the content contained within the display area 112 may be changed by manipulating a scroll bar 212 or by providing other types of interaction using one or more input devices 106. For example, certain keystrokes of a keyboard, button movements of a mouse device, or gestures using a touchpad or touch sensor may be used to scroll through rendered content 118. While FIG. 2 depicts a vertically-oriented scroll bar 212, in other implementations, a horizontally-oriented scroll bar 212 may be used to manipulate content in a horizontal direction. The rendered content 118 may include a content top 214 and a content bottom 216, which may define the boundaries of the content. In some implementations, the upper edge 204 and the lower edge 206 of the display area 112 may define the content top 214 and the content bottom 216, respectively. In other implementations, one or more of the content top 214 or the content bottom 216 may be positioned external to the display area 112. The content top 214 and content bottom 216 may be used to determine a content length L, indicated by the arrow at the left side of FIG. 2, associated with the rendered content 118. The content length L may include a physical length between the content top 214 and the content bottom 216, such as a number of pixels or a linear measurement. In other implementations, the content length L may include a number of lines, a number of words, a number of characters, or a quantity of data (e.g., a number of bytes).

The first feature 126(1) and the second feature 126(2) are shown within the portion of the content presented in the display area 112. A third feature 126(3), shown as a section containing product reviews, may be included in a portion of the user interface 202 not contained in the display area 112. A fourth feature 126(4), shown as a hidden or suppressed feature, such as content that only becomes visible (e.g., mouse-over content) when a pointer 124 is placed within a threshold distance of the fourth feature 126(4), is also shown within the display area 112. As another example, hidden or suppressed features 126 may include buttons or links that are not visibly presented in the display area 112 but may be accessed when selected using an input device 106, such as by use of a button on a mouse device or keyboard. As yet another example, hidden or suppressed features 126 may include content accessible by screen reading software. Positioning of a pointer 124 within a threshold distance of such a feature 126 may cause screen reading software to output simulated speech intended for receipt by a user 102 having impaired vision, while the feature remains invisible in the display area 112. As described previously, with regard to FIG. 1, the feature determination module 128 may determine the position of the pointer 124 and of one or more features 126 within the user interface 202. In some implementations, the feature determination module 128 may determine the position of one or more features 126 relative to the pointer 124. For example, the pointer 124 may be positioned a first distance D1 from the first feature 126(1) and a second distance D2 from the second feature 126(2). In some implementations, the feature determination module 128 may be configured to determine the distance between the pointer 124 and a feature 126 within the user interface 202 independent of whether that feature 126 is currently presented in the display area 112. For example, the feature determination module 128 may determine that the pointer 124 is positioned a third distance D3 from the third feature 126(3), which is included in a portion of the user interface 202 not contained in the display area 112. In some implementations, the feature determination module 128 may be configured to determine whether the user interface 202 contains any hidden features 126, such as the fourth feature 126(4). Hidden features 126 may include mouse-over content, pop-up windows, or other types of features 126 that may not be presented until the user 102 provides a particular input. For example, a particular tone may be emitted to indicate to the user 102 that one or more hidden features 126 are present in the user interface 202. The feature determination module 128 may be configured to determine the distance D4 between the pointer 124 and a location of the hidden fourth feature 126(4) independent of whether the fourth feature 126(4) is currently presented in the user interface 202.

In some implementations, the feature determination module 128 may be configured to determine the distance D between the pointer 124 and the left edge 208 of the display area 112 and between the pointer 124 and the right edge 210 of the display area 112. For example, the pointer 124 is depicted a fifth distance D5 from the left edge 208 and a sixth distance D6 from the right edge 210 of the display area 112. In other implementations, distances D between the pointer 124 and the upper edge 204 and between the pointer 124 and the lower edge 206 may be determined. The feature determination module 128 may also determine distances D between the pointer 124 and the content top 214 and between the pointer 124 and the content bottom 216. For example, the pointer 124 may be positioned a seventh distance D7 from the content top 214 and an eighth distance D8 from the content bottom 216.

When the rendered content 118 is produced, the audio generation module 130 may determine audio data 132 corresponding to one or more of the content type associated with the rendered content 118, the content length L, the presence of one or more features 126, the position of one or more features 126, the position of the pointer 124, the position of the pointer 124 relative to one or more of the features 126, the position of the pointer 124 relative to the content top 214 or content bottom 216, or the position of the pointer 124 relative to one or more edges of the display area 112. As described previously, a user 102 may provide user input selecting the particular elements of the rendered content 118 responsive to which sounds 110 may be emitted. A user 102 may also select particular sounds 110 to correspond to each element of the rendered content 118. A user 102 may further select the manner in which a sound 110 may be modified based on one or more of the size, distance D, length L, and so forth, associated with the rendered content 118 or with one or more features 126. The user input may be stored as configuration data 136. In some implementations, the configuration data 136 may include standardized or preselected audio data 132 corresponding to one or more preselected elements, independent of user input.

For example, when the rendering engine 114 produces the rendered content 118, the feature determination module 128 may determine a content type associated with the rendered content 118. The audio generation module 130 may access audio data 132 corresponding to a sound 110 indicative of that content type, which may be determined from the configuration data 136. The sound 110 may be output using a speaker or another output device 108.

The feature determination module 128 may also determine the content length L associated with the rendered content 118. The audio generation module 130 may access audio data 132 corresponding to a sound 110 indicative of a content length L. The audio generation module 130 may modify the audio data 132 using one or more audio characteristics, based on the content length L. For example, the audio generation module 130 may modify the amplitude, frequency, or duration of the sound 110 based on a value associated with content length L (e.g., a linear measurement or a quantity of data). Continuing the example, a tone having a high volume, a low frequency, or a long duration may indicate a large content length L. A tone having a low volume, a high frequency, or short duration may indicate a small content length L. In one implementation, the audio generation module 130 may cause emission of two sounds 110, separated by an interval of time. The length of the interval of time may correspond to the content length L. The interval of time may be determined using a table or another type of data structure in which intervals of time are stored in association with content lengths L. In other implementations, the interval of time may be determined using a formula or algorithm, such as an interval of 10 ms per line of content length L.

The feature determination module 128 may determine the presence of one or more features 126 within the rendered content 118. The audio generation module 130 may access audio data 132 corresponding to sounds 110 indicative of one or more of the features 126. The presentation of the sounds 110 using a speaker or other output device 108 may inform the user 102 of the presence of the one or more features 126 within the user interface 202. In some implementations, the feature determination module 128 may determine the position of one or more of the features 126. The presented sounds 110 may be modified by the audio generation module 130 based on the determined position(s) of the features 126. For example, one or more zones of the user interface 202 may be associated with a particular sound 110 or with a particular audio characteristic. Continuing the example, the presence of a feature 126 within the lower right quarter of a user interface 202 may be indicated by repeating a tone three times, by providing the tone with a longer or shorter duration, by increasing or decreasing the volume of the tone, and so forth. The feature determination module 128 may also determine the position of one or more features 126 relative to the pointer 124, relative to one or more edges of the display area 112, relative to the content top 214 or content bottom 216, or relative to other features 126. The audio data 132 selected for output and one or more audio characteristics used to modify the audio data 132 may be determined based on the position of one or more features 126 relative to other elements.

For example, the feature determination module 128 may determine a position of the pointer 124 relative to one or more features 126. Based on one or more of the distance D between the pointer 124 and a feature 126 or the direction of the feature 126 relative to the pointer 124, the sound 110 associated with that feature 126 may be modified. Continuing the example, the configuration data 136 may associate a tone having a frequency of 2000 Hz with the first feature 126(1). When the rendering engine 114 produces the rendered content 118, the feature determination module 128 may determine the position of the first feature 126(1), the position of the pointer 124, and the distance D1 between the pointer 124 and the first feature 126(1). The audio generation module 130 may determine audio data 132 corresponding to the 2,000 Hz tone and an audio characteristic, such as the amplitude or duration of the tone, corresponding to the distance D1. The audio data 132 and the audio characteristic may be determined from the configuration data 136. For example, the configuration data 136 may indicate that the distance D1 between the pointer 124 and the first feature 126(1) may be indicated by modifying the rate of repetition of the 2,000 Hz tone. When the rendered content 118 is produced, the 2,000 Hz tone may be output at a first rate. As the user 102 moves the pointer 124 within the user interface 202, the rate at which the tone is repeated may increase as the pointer 124 is moved closer to the first feature 126(1). The rate at which the tone is repeated may decrease as the pointer 124 is moved away from the first feature 126(1). In other implementations, the frequency, volume, or duration of the tone may be modified as the distance D1 between the pointer 124 and the first feature 126(1) changes.

As another example, the feature determination module 128 may determine the position of the third feature 126(3) and the distance D3 between the third feature 126(3) and the pointer 124. While the third feature 126(3) is not currently within the display area 112, the feature determination module 128 may determine the presence of the third feature 126(3) within the user interface 202. Sounds 110 corresponding to one or more of the presence, position, distance D3 from the pointer 124, or direction from the pointer 124 of the third feature 126(3) may be presented to the user 102 to indicate the presence, position, distance D3, or direction of the third feature 126(3).

In some implementations, one or more sounds 110 indicative of the position of the pointer 124 within the user interface 202 may be output. For example, a sound 110 corresponding to the position of the pointer 124 may be emitted based on the section of the display area 112 where the pointer 124 is positioned. In other implementations, sounds 110 may be presented based on the distance D5 between the pointer 124 and the left edge 208 of the display area 112 or the distance D6 between the pointer 124 and the right edge 210 of the display area 112. As another example, sounds 110 may be presented based on the distance D7 between the pointer 124 and the content top 214 or the distance D8 between the pointer 124 and the content bottom 216. Continuing the example, a sound 110 indicative of the distance D8 between the pointer 124 and the content bottom 216 may indicate a portion of the rendered content 118 that has not yet been navigated by the user 102.

Figure 3:
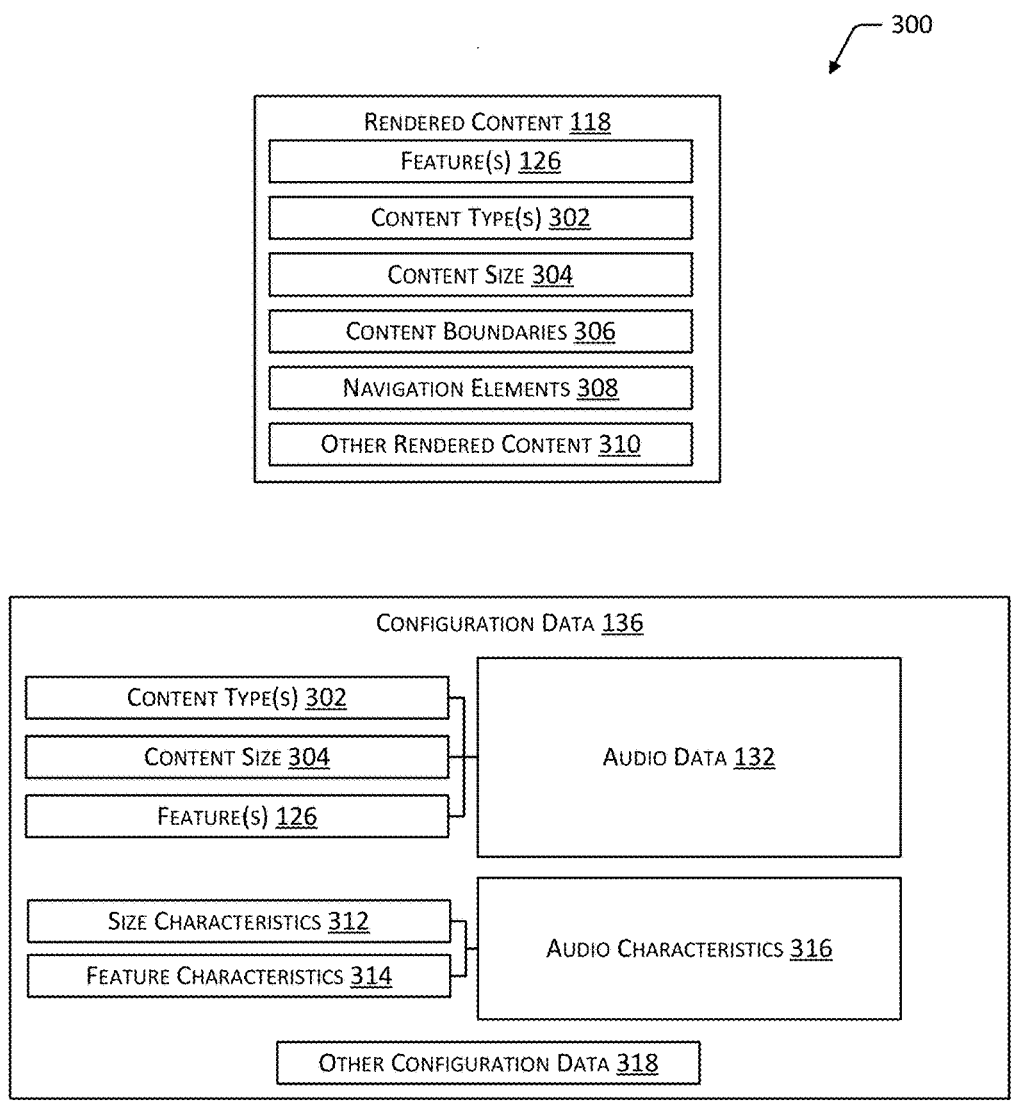
FIG. 3 is a block diagram illustrating examples of rendered content and configuration data.

FIG. 3 is a block diagram 300 illustrating examples of rendered content 118 and configuration data 136.

Rendered content 118 may include any type of data configured to be rendered by the user device 104, a server, or another computing device in communication with the user device 104. For example, rendered content 118 may include data for presenting a webpage, an electronic book or other publication, or other content for presentation to a user 102. While a portion of the rendered content 118 may be displayed using a display device, in some implementations, use of a display device may be omitted, and a user 102 may navigate the rendered content 118 based on the sounds 110 presented to the user 102.

The rendered content 118 may include one or more features 126. Features 126 may include buttons, links, menus, text boxes, and other elements with which a user 102 may interact using an input device 106. For example, a feature 126 may include a button for purchasing a product, a link to a subsequent webpage, a drop down menu, a text box for entering a search query, hidden content, and so forth. Hidden content may include a button, link, and so forth, that is not visibly presented but may be accessible when clicked or otherwise selected. For example, hidden content may become visible when the pointer 124 is within proximity of a hidden feature 126, such as when the position of the pointer 124 is within the boundary of the hidden content. Features 126 may also include particular text, graphics, and so forth. For example, a feature 126 may include a section of a webpage containing user-submitted product reviews or a section of an electronic book indicating the beginning of a chapter. The presence of one or more features 126 and the position of the features 126 within the rendered content 118 may be determined by the feature determination module 128. In some implementations, the rendered content 118 may include indications of one or more features 126, which may be determined by the feature determination module 128. For example, a DOM tree or other metadata associated with the rendered content 118 may indicate the presence of a particular button, link, search bar, and so forth. In other implementations, the feature determination module 128 may perform object recognition or text recognition to determine features 126 within the rendered content 118.

The rendered content 118 may also include one or more content types 302 corresponding to the content. A content type 302 may include a general type or category associated with the rendered content 118, such as an electronic book, a webpage, and so forth. A content type 302 may include a subcategory associated with the rendered content 118, such as a webpage describing a product, depicting the contents of a user's electronic shopping cart, for purchasing a product, containing user reviews of a product, containing user account information, and so forth. A content type 302 may also include an indication regarding whether the rendered content 118 contains secured information (e.g., content designated for special handling). For example, secured information may include financial information, medical information, or other types of information intended to remain confidential. In some implementations, the content type 302 may include a determination regarding whether the rendered content 118 is accessed via a secure (e.g., Hypertext Transfer Protocol Secure (HTTPS)) connection. A user 102 may select one or more sounds 110 to be associated with one or more content types 302. When rendered content 118 having a particular content type 302 is produced, the sound 110 corresponding to that content type 302 may be emitted by a speaker or other output device 108. The content type 302 associated with rendered content 118 may be determined by a flag, metadata, DOM tree, or another portion of the rendered content 118 indicative of the nature of the rendered content 118. In other implementations, the feature determination module 128 may perform object recognition or text recognition to determine a content type 302 associated with rendered content 118. For example, correspondence between stored data indicative of a content type 302 and one or more text strings, one or more graphics, or a particular layout of graphical objects from the rendered content 118 may indicate the content type 302 associated with the rendered content 118.

The rendered content 118 may also include a content size 304. In some implementations, the content size 304 may include a linear measurement. For example, the content size 304 may include a content length L associated with the rendered content 118, such as the distance D between a content top 214 and a content bottom 216 of a webpage, as shown in FIG. 2. Content size 304 may also include a width of rendered content 118, such as the distance D between the left and right boundaries of the rendered content 118. In other implementations, content size 304 may include a non-linear measurement. For example, non-linear measurements may include the number of pages in an electronic book or the number of pages within a chapter or section of an electronic book, a number of lines or characters in a webpage, a number of bytes of rendered data, and so forth. The content size 304 of the rendered content 118 may be determined based on a DOM tree, metadata, or other data associated with the rendered content 118. In other implementations, the feature determination module 128 may perform object recognition or text recognition to determine a content size 304 associated with the rendered content 118. For example, a rendered webpage may include a scroll bar 212 indicative of the content length L of the webpage. As another example, an electronic book may include an indication of a number of pages within the electronic book or within a chapter of the electronic book, a percentage of completed or remaining pages within the book or chapter, and so forth.

A user 102 may select one or more sounds 110 to be associated with one or more content sizes 304. For example, an interval of time corresponding to a length of a webpage or the size of an electronic book may be determined. A first sound 110(1) may be emitted prior to passage of the interval of time. After passage of the interval of time, a second sound 110(2) may be emitted. The first sound 110(1) and the second sound 110(2) may be identical sounds 110 or different sounds 110. As another example, a sound 110 may be emitted having a duration, amplitude, or frequency corresponding to the content size 304 associated with rendered content 118. Continuing the example, a tone may be provided with a duration corresponding to the number of pages or lines of text remaining in a current chapter of an electronic book, such as a duration of 10 ms per page. Sounds 110 may be provided to the user 102 indicative of a portion of a content size 304 that has already been navigated by a user 102, a portion of the content size 304 that has not yet been navigated by a user 102, a portion of rendered content 118 located above or below a pointer 124, a total length or size associated with rendered content 118, and so forth. For example, the duration, amplitude, frequency, rate of repetition, and so forth, may indicate the number of pages within a chapter of an electronic book subsequent to a current position within the electronic book associated with a pointer 124 (e.g., the current page rendered for presentation by a user device 104).

The rendered content 118 may further include one or more content boundaries 306. Content boundaries 306 may include the beginning and ending of rendered content 118, such as the first and last pages of an electronic book or of a chapter of an electronic book. Content boundaries 306 may include physical borders that limit scrolling or navigation of rendered content 118, such as a content top 214, a content bottom 216, left and right edges of a user interface 202, and so forth. In some implementations, the content boundaries 306 may be used to determine the content size 304 associated with rendered content 118. For example, the distance D between a content top 214 and a content bottom 216 of a webpage may be used to determine a content length L of the webpage. As another example, the first and last pages of an electronic book may be used to determine the content size 304 associated with the electronic book (e.g., the number of pages or lines between the first and last pages).

The rendered content 118 may additionally include one or more navigation elements 308. Navigation elements 308 may include portions of rendered content 118 that may be used to scroll or otherwise navigate the rendered content 118, such as a scroll bar 212, the pointer, buttons, links, and so forth. For example, rendered content 118 may include a scroll bar 212 with which a user 102 may interact to change the portion of the rendered content 118 accessible to a pointer 124. As another example, the rendered content 118 may include an electronic book, article, webpage, or similar content that may be navigated by selecting buttons, links, or regions of the rendered content 118 using an input device 106. As yet another example, rendered content 118 may be scrolled or accessed by moving a pointer 124 to the boundaries of a display area 112, by selecting and "dragging" a portion of the content presented in a user interface 202, and so forth.

Other rendered content 310 may include tags, flags, metadata, or other indicia that may be used to determine one or more features 126, a content type 302, a content size 304, and so forth, associated with rendered content 118. For example, other rendered content 310 may include a layout or arrangement of elements that may be identified by the feature determination module 128 to determine one or more features 126, content types 302, content sizes 304, and so forth.

Configuration data 136 may include data associating one or more elements of rendered content 118 with audio data 132 corresponding to sounds 110 that may be emitted by a speaker responsive to determination of the elements of the rendered content 118. For example, a user 102 may select one or more features 126, content types 302, or other characteristics (e.g., position of features 126, relative distances D or directions, and so forth) of rendered content 118, such as the content size 304. The user 102 may also select one or more particular sounds 110 that may be emitted responsive to those characteristics. When rendered content 118 that includes a particular feature 126 or other element indicated in the configuration data 136 is presented to the user 102, the corresponding sound 110 may be emitted to indicate the presence of that feature 126 or element. Characteristics of the sound 110 may also indicate characteristics of that feature 126 or element. In some implementations, a characteristic of one or more elements of the rendered content 118, such as a value corresponding to a content size 304 or a distance D between a feature 126 and the pointer 124 may be determined. The audio data 132 may be modified to produce a modified sound 110 that indicates the characteristic of the element(s). For example, the amplitude, duration, frequency, or rate of repetition of a tone may be modified based on the distance D between a feature 126 corresponding to that tone and a pointer 124. The particular characteristics responsive to which audio data 132 may be modified may be selected by a user 102 providing user input using one or more input devices 106. In other implementations, the audio data 132 associated with one or more features 126 or other elements of rendered content 118, or the modifications to audio data 132 that may be made responsive to determination of characteristics of the element (s), may be determined independent of user input. For example, the configuration data 136 may include one or more preselected or default associations between audio data 132 and one or more features 126. As another example, the configuration data 136 may include a preselected or default setting in which the duration of a sound 110 indicative of a feature 126 is one ms per pixel of distance D between the feature 126 and the pointer 124.

The configuration data 136 may include one or more content types 302, one or more content sizes 304, or one or more features 126, at least a portion of which may be selected by a user 102 or determined independent of user input. Each content type 302, content size 304, or feature 126 stored as configuration data 136 may include an indication of audio data 132 associated therewith. The audio data 132 may be indicative of a sound 110 corresponding to the associated content type 302, content size 304, or feature 126. For example, a first feature 126(1) may be stored in association with audio data 132 indicative of a first sound 110(1), such as a tone having a frequency of 1,200 Hz. A second feature 126(2) may be stored in association with audio data 132 indicative of a second sound 110(2), such as a tone having a frequency of 1,500 Hz. In a similar manner, tones that differ in duration, amplitude, phase, or other characteristics may be used to enable a user 102 to differentiate between the presence of the first feature 126(1) and the second feature 126(2) within a user interface 202. Other types of sounds 110, such as a series of tones, a recorded sound 110 such as a WAV file or MPEG file, and so forth, may be used. The characteristics of other types of sounds 110, such as frequency, amplitude, phase, duration, and so forth, may be varied to differentiate between the presence of the first feature 126(1) and the second feature 126(2) within the user interface 202.

The configuration data 136 may also include one or more size characteristics 312. Size characteristics 312 may include a type associated with a content size 304. For example, a size characteristic 312 may include data indicating that a determined content size 304 corresponds to a content length L of a webpage, a number of pages within an electronic book or other type of document, and so forth. Size characteristics 312 may also include a value corresponding to a determined content size 304. For example, a size characteristic 312 may include a number of pixels, lines, characters, pages, or bytes of data associated with rendered content 118.

The configuration data 136 may further include one or more feature characteristics 314. Feature characteristics 314 may include a position of a feature 126 within a user interface 202. For example, a feature 126 may be located within a particular portion or zone of a webpage. As another example, a feature 126 may be located within a distance D of an edge of a user interface 202. Feature characteristics 314 may include a distance D of a feature 126 from the pointer 124. The distance D between the pointer 124 and a feature 126 may change as a user 102 moves the pointer 124 within the user interface 202 using an input device 106. Feature characteristics 314 may also include a status or type associated with one or more features 126. For example, a feature characteristic 314 may include a specific type of link, a destination of the link, an indication that a link has previously been selected, and so forth. Feature characteristics 314 may further include a shape, dimensions, a color, or other physical characteristics of a particular feature 126.

Each size characteristic 312 and feature characteristic 314 may be stored in a data store 116 in association with one or more audio characteristics 316. An audio characteristic 316 may include a trait of an emitted sound 110 that may be modified to indicate one or more of the size characteristics 312 or feature characteristics 314. For example, an audio characteristic 316 may include the frequency of a tone, note, or other type of sound 110. Continuing the example, a tone having a low frequency may be emitted to indicate a first feature characteristic 314 or size characteristic 312, such as a feature 126 that is a large distance D from a pointer 124 or content having a large content size 304. A tone having a high frequency may indicate a feature 126 that is a short distance D from a pointer 124 or content having a small content size 304. In some implementations, the frequency of a sound 110 may be modulated as the sound 110 is emitted. For example, the frequency of a tone may increase as a sound 110 is produced to indicate a feature 126 that is located within an upper portion of a user interface 202. The frequency of the tone may decrease as the sound 110 is produced to indicate a feature 126 located within a lower portion of the user interface 202.

As another example, an audio characteristic 316 may include the amplitude of a tone, note, or other type of sound 110. Continuing the example, a tone having a high volume may indicate a feature 126 that is a short distance D from a pointer 124 or content having a large content size 304. A tone having a low volume may indicate a feature 126 that is a large distance D from the pointer 124 or content having a small content size 304. An audio characteristic 316 may also include the duration of a tone or other type of sound 110. For example, a tone having a long duration may indicate a feature 126 that is a large distance D from a pointer 124 or content having a large content size 304. A tone having a short duration may indicate a feature 126 that is a short distance D from the pointer 124 or content having a small content size 304.

Audio characteristics 316 may also include the timing at which one or more sounds 110 are produced. For example, the rate of repetition of sound 110 indicative of a feature 126 may increase as the distance D between a pointer 124 and the feature 126 decreases, and the rate of repetition may decrease as the distance D increases. As another example, the rate of repetition of a sound 110 indicative of a portion of a content length L below a pointer 124 may increase as the pointer 124 moves toward the content bottom 216 and decrease as the pointer 124 moves toward the content top 214. In some implementations, a sound 110 may be provided twice, separated by an interval of time based on a feature characteristic 314 or size characteristic 312. In other implementations, two sounds 110 may be provided in succession, separated by the interval of time. For example, an interval of time corresponding to the length of a webpage may be determined. A first sound 110(1) may be emitted when the webpage is rendered. A second sound 110(2) may subsequently be emitted after the passage of the interval of time. Thus, a webpage having a short content length L may be indicated by two sounds 110 emitted in close proximity to one another. A webpage having a large content length L may be indicated by two sounds 110 spaced apart by a significant length of time. As another example, an interval of time corresponding to the distance D between the pointer 124 and a feature 126 may be determined. A first sound 110(1) may be emitted when a webpage is rendered. A second sound 110(2) may be subsequently emitted after passage of the interval of time. Thus, two sounds 110 emitted in close proximity to one another may indicate a feature 126 that is a short distance D from the pointer 124. Two sounds 110 spaced apart by a significant length of time may indicate a feature 126 that is a significant distance D from the pointer 124.

Any combination of audio characteristics 316 may be associated with one or more size characteristics 312 or feature characteristics 314. For example, one or more of the frequency, duration, amplitude, or rate of repetition of a tone may be modified by the audio generation module 130 based on the distance D associated with a feature 126 or the length of rendered content 118. The particular characteristics of audio data 132 that are modified and the size characteristics 312 or feature characteristics 314 responsive to which the audio data 132 is modified may be determined based on user input. In other implementations, particular audio characteristics 316 may be associated with particular size characteristics 312 or feature characteristics 314 independent of user input.

Other configuration data 318 may include other characteristics of rendered content 118, such as characteristics of a content type 302, content boundaries 306, navigation elements 308, and so forth, stored in association with audio characteristics 316. Other configuration data 318 may also include threshold values relating to one or more size characteristics 312 or feature characteristics 314. For example, audio data 132 generated by the audio generation module 130 may be modified (e.g., provided with one or more different audio characteristics 316) if the distance D between a feature 126 and the pointer 124 changes by more than a threshold quantity.

Figure 4:
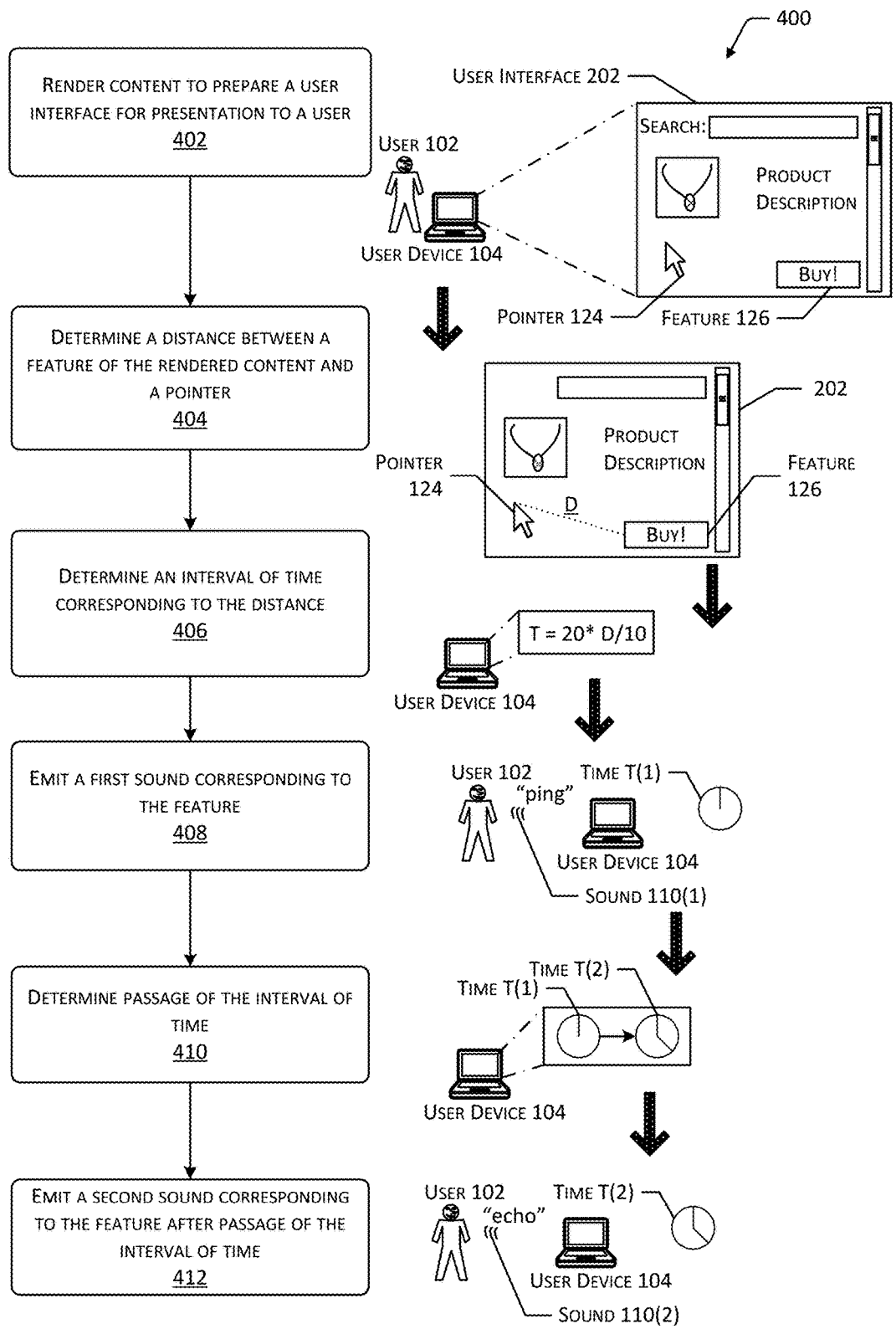
FIG. 4 illustrates a method for determining a distance between a feature and a pointer and presenting sounds to a user based on the distance.

FIG. 4 illustrates a method 400 for determining a distance D between a feature 126 and a pointer 124 and presenting sounds 110 to a user 102 based on the distance D. At 402, rendered content 118 may be produced to prepare a user interface 202 for presentation to a user 102. For example, a rendering engine 114 associated with the user device 104 or another computing device in communication with the user device 104 may receive or access source content 122, such as HTML, CSS, JavaScript, Java code, image files, and so forth, corresponding to a user interface 202. The rendering engine 114 may render the rendered content 118, which may induce a DOM, vector graphics, bitmapped images, and so forth, for presentation using the user device 104. In some implementations, the rendered content 118 may be displayed on a display device. However, in other implementations, the rendered content 118 may be rendered without necessarily displaying the rendered content 118. The user interface 202 may include one or more features 126 and a pointer 124 associated with one or more input devices 106. The pointer 124 may include a visible cursor. However, in some implementations, the pointer 124 may include one or more positions within the user interface 202 indicated by or associated with an input device 106 independent of the generation of any visible representation of the pointer 124.

At 404, a distance D between a feature 126 of the rendered content 118 and the pointer 124 may be determined. For example, a feature determination module 128 associated with the user device 104 may determine the position of one or more features 126. The feature determination module 128 may determine the position of the pointer 124 from the user interface module 134. Based on the positions of the pointer 124 and a particular feature 126 of interest, the distance D between the pointer 124 and the particular feature 126 may be determined. The distance D may include a linear measurement, such as a unit of length (e.g., millimeters (mm)) or a number of pixels between the pointer 124 and the feature 126. In other implementations, the distance D may include a qualitative measurement, such as a number of lines or characters, a percentage of the total distance across the user interface 202, or a quantity of data (e.g., number of bytes), indicative of the space between the pointer 124 and the feature 126.

At 406, an interval of time corresponding to the distance D may be determined. For example, an audio generation module 130 associated with the user device 104 may access a table or other arrangement of data in which distances D are associated with intervals of time. In other implementations, the audio determination module 130 may determine an interval of time using an algorithm based on the distance D. Continuing the example, an algorithm may indicate an interval of time equal to 20 ms per 10 pixels of distance D between the pointer 124 and the feature 126.

At 408, a first sound 110(1) corresponding to the feature 126 may be emitted. For example, the audio generation module 130 may access configuration data 136 to determine audio data 132 associated with a particular feature 126. The configuration data 136 may also include data indicative of audio characteristics 316 that may be used to modify the audio data 132 based on one or more feature characteristics 314, such as the distance D. Continuing the example, the audio data 132 may correspond to a tone having a frequency associated with the feature 126. The audio characteristic 316 modified based on the distance D may include the interval of time between repetitions of one or more sounds 110. Upon emission of the first sound 110(1) the audio generation module 130 may begin determining passage of the interval of time. For example, the first sound 110(1) may be emitted at a first time T(1).

At 410, passage of the interval of time may be determined. For example, the audio generation module 130 may determine that a quantity of time corresponding to the distance D has passed subsequent to emission of the first sound 110(1). One or more clocks may be associated with the user device 104 to determine information indicative of date, time, ticks, and so forth. Data from the clocks may be used to trigger subsequent actions.

At 412, a second sound 110(2) corresponding to the feature 126 may be emitted after passage of the interval of time. For example, the audio generation module 130 may determine a second time T(2) after the passage of the interval of time, after which the second sound 110(2) may be emitted. In some implementations, the second sound 110(2) may be identical to the first sound 110(1). In other implementations, the second sound 110(2) may differ from the first sound 110(1). For example, the second sound 110(2) may include a different frequency, amplitude, duration, and so forth. As another example, the second sound 110(2) may include a different recorded sound 110 (e.g., a different WAV of MPEG file). The length of the interval of time may indicate the distance D between the feature 126 and the pointer 124, analogous to a sonar ping and echo. For example, the second sound 110(2) may follow closely after the first sound 110(1) when the feature 126 and the pointer 124 are within close proximity of one another. The interval of time may have a greater length when the feature 126 and the pointer 124 are spaced a significant distance D from one another.

Figure 5:
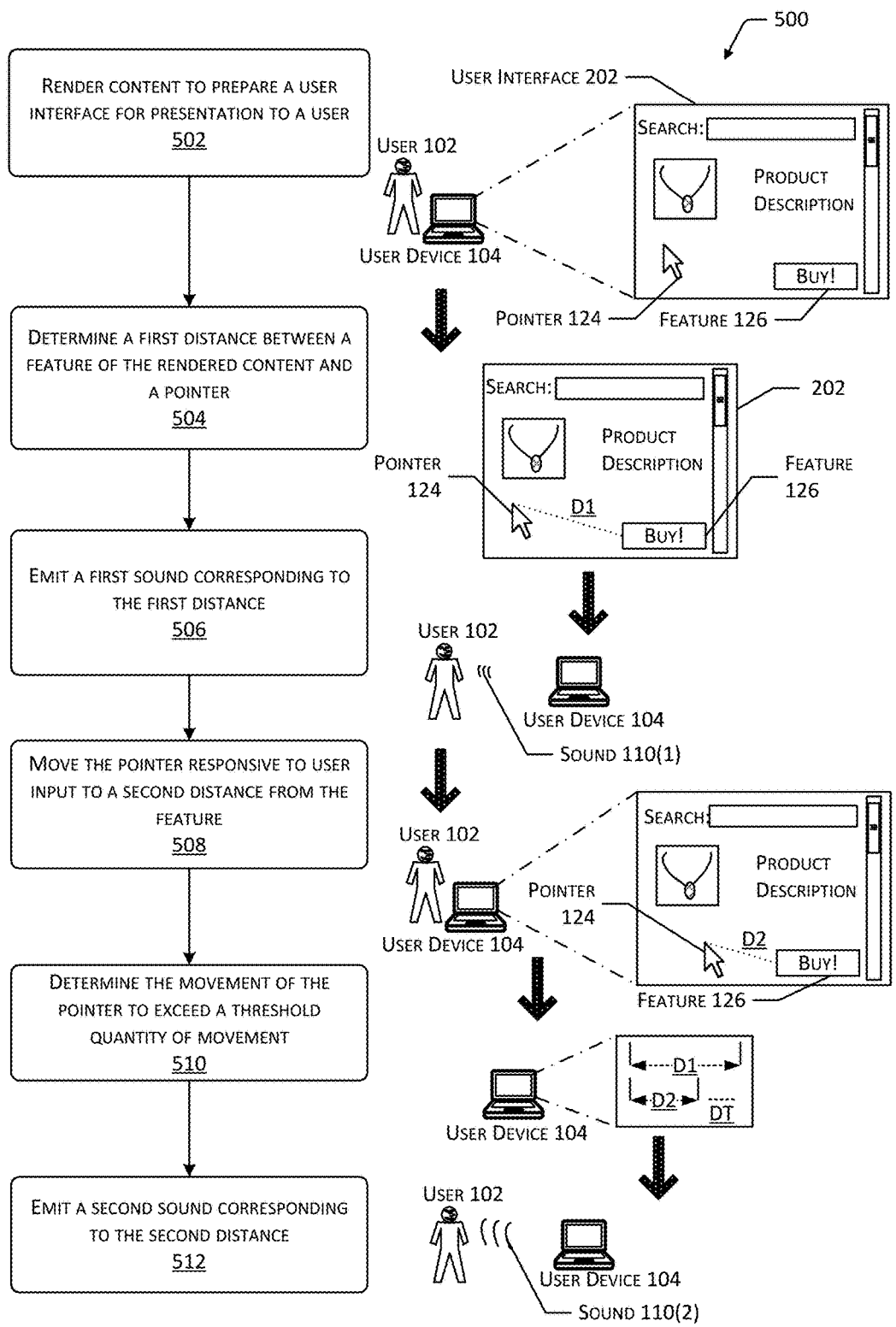
FIG. 5 illustrates a method for determining movement of a pointer and presenting sounds responsive to the movement.

FIG. 5 illustrates a method 500 for determining movement of a pointer 124 and emitting one or more sounds 110 responsive to the movement. At 502, rendered content 118 may be rendered to prepare a user interface 202 for presentation to a user 102. For example, a rendering engine 114 associated with a user device 104 may receive source content 122 and render the rendered content 118. As described previously, the rendered content 118 may be displayed using a display device. However, in other implementations, the user interface 202 may not necessarily be displayed, and a user 102 may interact with the user interface 202 based on output from one or more output devices 108, such as audio devices or haptic devices.

At 504, a first distance D1 between a feature 126 of the rendered content 118 and a pointer 124 may be determined. As described previously, a feature determination module 128 associated with the user device 104 may determine the position of one or more features 126, and the user interface module 134 may determine the position of the pointer 124. Based on the positions of the pointer 124 and a particular feature 126 of interest, a first distance D1 between the pointer 124 and the particular feature 126 may be determined. In other implementations, the feature determination module 128 may be configured to determine a direction of the feature 126 relative to the pointer 124.

At 506, a first sound 110(1) corresponding to the first distance D1 may be emitted. For example, an audio generation module 130 may determine audio data 132 that corresponds to the feature 126 and one or more audio characteristics 316 that correspond to the first distance D1. As described previously with regard to FIG. 3, configuration data 136 may include audio data 132 stored in association with data indicative of one or more features 126. The audio data 132 may correspond to one or more sounds 110 associated with one or more particular features 126. The audio data 132 may be modified using one or more audio characteristics 316. The audio characteristics 316 may be determined based on one or more feature characteristics 314. For example, the distance D1 between the feature 126 and the pointer 124 may constitute a feature characteristic 314. Based on the value of the distance D1, one or more audio characteristics 316 of the audio data 132 that corresponds to the feature 126 may be used to modify the audio data 132. Other feature characteristics 314 may include the dimensions (e.g., width or height) of a feature 126, the position of the feature 126 within a user interface 202, the direction of the feature 126 relative to the pointer 124, and so forth. The first sound 110(1) may therefore include one or more of a frequency, duration, amplitude, phase, directionality, or rate of repetition corresponding to the determined audio characteristic(s) 316. Continuing the example, the first sound 110(1) may have a low amplitude when the distance D1 between the feature 126 and the pointer 124 is large.

At 508, the pointer 124 may be moved responsive to user input to a second distance D2 from the feature 126. For example, a user 102 may provide input to the user device 104 using a mouse device, touchpad, touch sensor, joystick, SNP, head tracker, or one or more other types of input devices 106. The input may be processed by the user interface module 134 and may be operative to move the pointer 124 within the user interface 202. For example, responsive to the first sound 110(1), the user 102 may move the pointer 124 relative to the feature 126 to change the distance D between the pointer 124 and feature 126. Audio output responsive to the changed distance D may be used to determine the proximity of the feature 126 to the pointer 124, the direction of the feature 126 relative to the pointer 124, and so forth.

At 510, the movement of the pointer 124 may be determined to exceed a threshold quantity of movement. As described previously with regard to FIG. 3, the configuration data 136 may include one or more threshold distances DT. In some implementations, movement of a pointer 124 a distance D less than the threshold distance DT may be disregarded. Movement of the pointer 124 a distance greater than the threshold distance DT may result in a determination of movement responsive to which the user device 104 may perform one or more actions. For example, the user interface module 134, the feature determination module 128, or another module associated with the user device 104 may determine the difference between the first distance D1 and the second distance D2, which may yield the distance D moved by the pointer 124. If the distance D moved by the pointer 124 is determined to be greater than or equal to the threshold distance DT, the user device 104 may perform one or more subsequent actions, as described below.

At 512, responsive to the determination of movement of the pointer 124, a second sound 110(2) corresponding to the second distance D2 may be emitted. The second sound 110(2) may include one or more audio characteristics 316 that differ from those corresponding to the first sound 110(1). For example, the second sound 110(2) may be provided with an amplitude greater than that of the first sound 110(1) to indicate that the second distance D2 is shorter than the first distance D1. As another example, the second sound 110(2) may be provided with a duration greater than that of the first sound 110(1). As yet another example, the second sound 110(2) may be provided with a higher frequency than that of the first sound 110(1).

Figure 6:
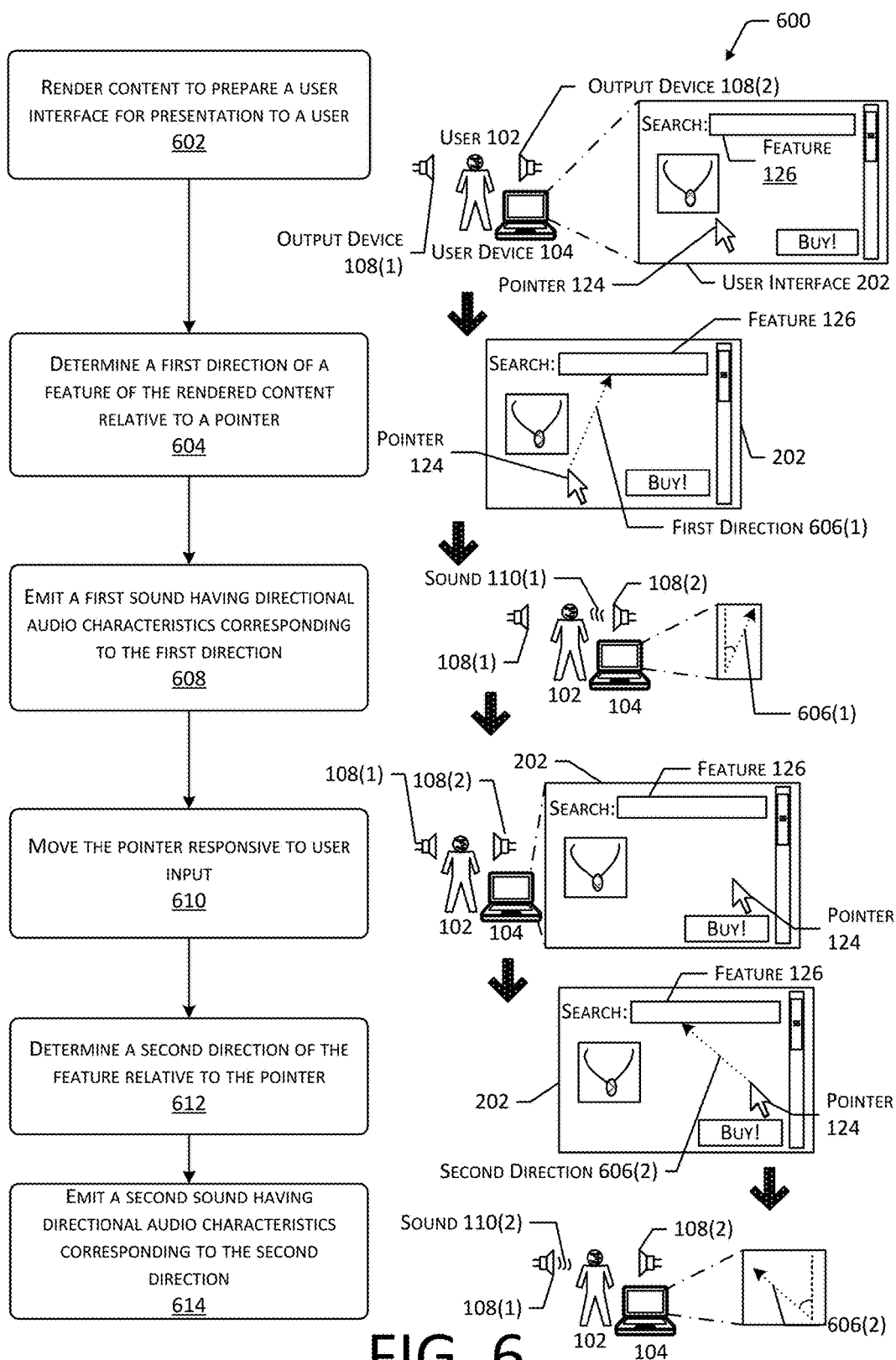
FIG. 6 illustrates a method for determining a direction of a feature relative to a pointer and presenting sounds responsive to the direction.

FIG. 6 illustrates a method 600 for determining a direction of a feature 126 relative to a pointer 124 and presenting sounds 110 indicative of the determined direction. At 602, rendered content 118 may be produced to prepare a user interface 202 for presentation to a user 102. For example, the rendered content 118 may be presented to the user 102 via a user device 104, which may include one or more output devices 108, such as speakers. Continuing the example, the user device 104 may include at least a first output device 108(1) and a second output device 108(2), which may include multiple speakers of a surround-sound audio system. In other implementations, the output device(s) 108 may include a monaural speaker, one or more haptic devices, and so forth. The user interface 202 may include a pointer 124 associated with one or more input devices 106 and one or more features 126, such as a text box configured for receiving search queries.

At 604, a first direction 606(1) of a feature 126 of the rendered content 118 may be determined relative to the pointer 124. For example, a feature determination module 128 associated with the user device 104 may determine a position of the feature 126, and the user interface module 134 may determine the position of the pointer 124. Based on the positions of the pointer 124 and the feature 126, the direction 606(1) in which the feature 126 is located relative to the pointer 124 may be determined. FIG. 6 depicts the feature 126 positioned above and toward the right of the pointer 124.

At 608, a first sound 110(1) having one or more audio characteristics 316 corresponding to the first direction 606(1) may be emitted. For example, an audio characteristic 316 may include the directionality of the sound 110(1). Responsive to the determination that the feature 126 is located toward the right of the pointer 124, the second output device 108(2), which may be located to the right of the user 102, may be used to provide the first sound 110(1) that appears to emanate from the same direction in which the feature 126 is located relative to the pointer 124. Other audio characteristics 316 of the first sound 110(1), such as the frequency, amplitude, rate of repetition, and so forth, may also be modified to indicate the first direction 606(1) or to indicate the distance D between the pointer 124 and the feature 126. In other implementations, such as in the absence of speakers capable of altering the directionality of the first sound 110(1), one or more of the frequency, amplitude, rate of repetition, and so forth, of the first sound 110(1) may be used to indicate the first direction 606(1). For example, a tone that modulates from a low frequency to a high frequency may be used to indicate a feature 126 that is positioned to the right of the pointer 124. The rate or amount of the modulation may indicate the distance D between the pointer 124 and the feature 126. As another example, haptic feedback may be used to indicate the first direction 606(1). For example, a user 102 may contact multiple haptic devices, each positioned in contact with a particular extremity of the user 102. Haptic devices located on one or more of a user's 102 right arm or right leg may be used to indicate features 126 located toward the right, while haptic devices located on one or more of a user's left arm or left leg may be used to indicate features located toward the left. Similarly, haptic devices located on one or more of a user's 102 legs may be used to indicate features located below the pointer 124, while haptic devices located on one or more of a user's 102 arms may be used to indicate features above the pointer 124.

At 610, the pointer 124 may be moved responsive to user input. For example, a user 102 may use an input device 106 to attempt to move the pointer 124 toward or away from the feature 126, responsive to the emitted first sound 110(1). FIG. 6 depicts the pointer 124 positioned toward the right and above the previous position of the pointer 124.

At 612, a second direction 606(2) of the feature 126 relative to the pointer 124 may be determined. For example, based on the new position of the pointer 124, the feature determination module 128 may determine that the feature 126 is located upward and toward the left of the pointer 124.

At 614, a second sound 110(2) corresponding to the second direction 606(2) may be emitted. For example, responsive to the determination that the feature 126 is located toward the left of the pointer 124, the first output device 108(1), which may be located to the left of the user 102, may be used to provide a second sound 110(2) that appears to emanate from the same direction in which the feature 126 is located relative to the pointer 124. As described previously, other audio characteristics 316, or haptic feedback, may also be used to indicate the second direction 606(2) in place of or in addition to the directionality of the second sound 110(2).

Figure 7:
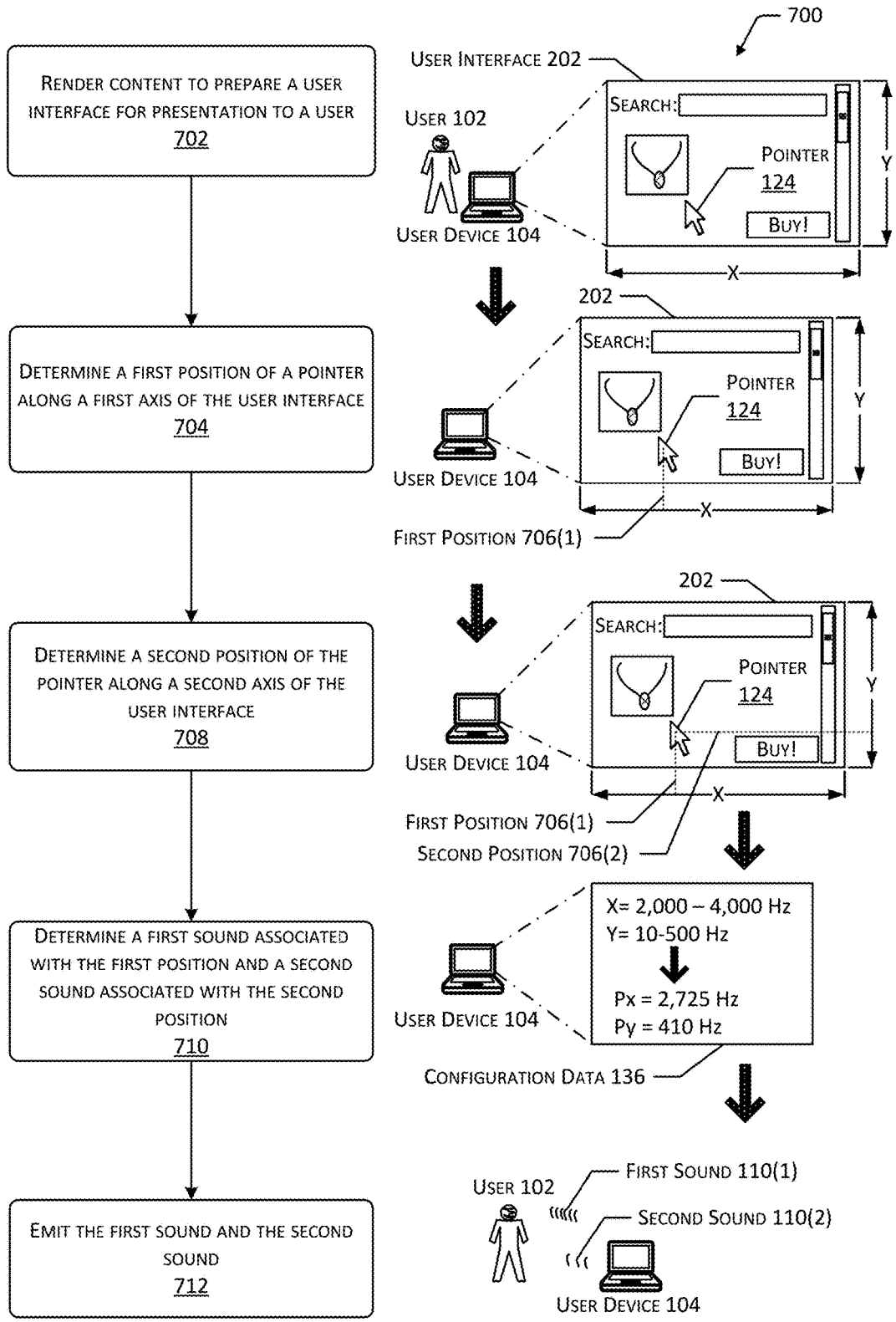
FIG. 7 illustrates a method for determining a position of a pointer within a user interface and presenting sounds responsive to the position.

FIG. 7 illustrates a method 700 for determining a position of a pointer 124 within a user interface 202 and presenting sounds 110 responsive to the position. At 702, rendered content 118 may be produced to prepare a user interface 202 for presentation to a user 102. As described previously, a rendering engine 114 associated with a user device 104 may receive or access source content 122 and render the rendered content 118 for presentation. The rendered content 118 may be presented with or without use of a display device. The user interface 202 may include a pointer 124 associated with one or more input devices 106. The pointer 124 may be positioned at a point along the X-axis and Y-axis of the user interface 202.

At 704, a first position 706(1) of the pointer 124 may be determined along a first axis (e.g., the X-axis) of the user interface 202. For example, a feature determination module 128 associated with the user device 104 may determine a position of the pointer 124 between the left and right edges of the user interface 202. The feature determination module 128 may determine the first position 706(1) of the pointer 124 from the user interface module 134. In other implementations, the feature determination module 128 may determine the first position 706(1) of the pointer 124 based on data associated with the rendered content 118, data determined from one or more input devices 106, or data determined from the user device 104. In other implementations, the feature determination module 128 may determine the first position 706(1) of the pointer 124 using object recognition. For example, correspondence between particular text or a particular graphic within the rendered content 118 and stored data indicative of particular features 124 may indicate the presence of the features 124 within the rendered content 118.

At 708, a second position 706(2) of the pointer 124 may be determined along a second axis (e.g., the Y-axis) of the user interface 202. For example, the feature determination module 128 may determine the second position 706(2) of the pointer 124 within the content length L of the rendered content 118. Continuing the example, the feature determination module 128 may determine the second position 706(2) of the pointer 124 relative to the content top 214 or the content bottom 216. In other implementations, the feature determination module 128 may determine the second position 706(2) of the pointer 124 from the user input module 134 using object recognition.

At 710, a first sound 110(1) associated with the first position 706(1) and a second sound 110(2) associated with the second position 706(2) may be determined. For example, an audio generation module 130 associated with the user device 104 may access configuration data 136. The configuration data 136 may include audio data 132 stored in association with one or more features 126 or feature characteristics 314. For example, the configuration data 136 may include audio data 132 corresponding to the position of the pointer 124 within particular zones or regions of the user interface 202, the position of the pointer 124 relative to one or more edges of the user interface 202, the position of the pointer 124 along one or more axes of the user interface 202, the position of the pointer 124 relative to one or more features 126 within the user interface 202, and so forth. Continuing the example, the configuration data 136 may include audio data corresponding to tones having a frequency ranging from 2,000 Hz to 4,000 Hz associated with a first position 706(1) of the pointer 124 along the X-axis of the user interface 202. The configuration data 136 may include audio data 132 corresponding to tones having a frequency ranging from 10 Hz to 500 Hz associated with a second position 706(2) of the pointer 124 along the Y axis of the user interface 202. Based on the particular position of the pointer 124 along both axes, the first sound 110(1) corresponding to the first position 706(1) may include a 2,725 Hz tone. The second sound 110(2) corresponding to the second position 706(2) may include a 410 Hz tone.

At 712, the first sound 110(1) and the second sound 110(2) may be emitted. In some implementations, audio data 132 corresponding to the sounds 110 may be generated and provided to an output device 108, such as one or more speakers associated with the user device 104. In other implementations, the audio data 132 may be determined and generated by one or more computing devices remote from the user device 104, and the audio data 132 may be provided to the speakers by the associated computing devices to cause output of the sounds 110.

Figure 8:
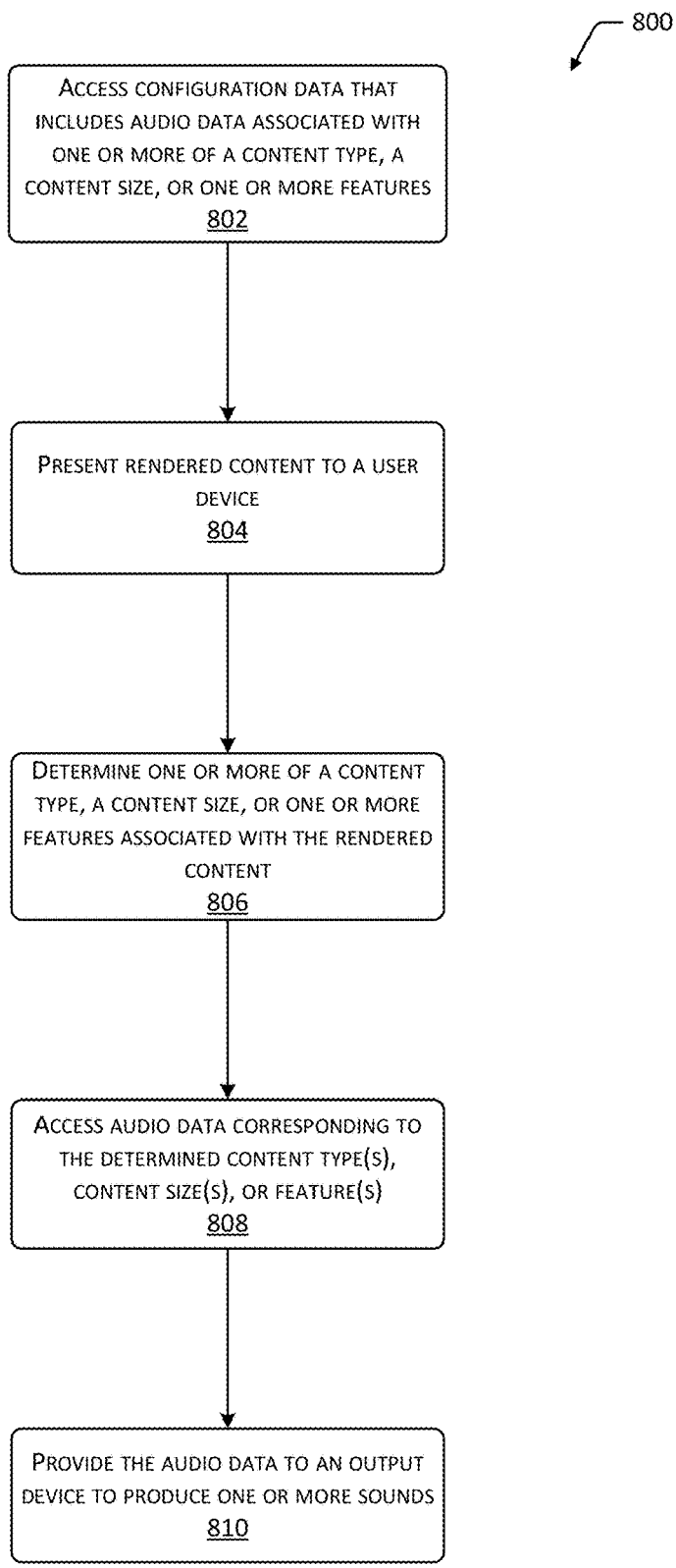
FIG. 8 is a flow diagram illustrating a method for determining elements of rendered content and outputting sounds responsive to the determined elements.

FIG. 8 is a flow diagram 800 illustrating a method for determining elements of rendered content 118, such as features 124, a content size 304, a content type 302, and so forth, and outputting sounds 110 responsive to the determined elements.

Block 802 accesses configuration data 136 that includes audio data 132 associated with one or more of a content type 302, a content size 304, or one or more features 126. In some implementations, configuration data 136 may be received via user input. For example, a user 102 may indicate particular features 126 or content types 302 responsive to which the user 102 desires to receive audio feedback. In other implementations, configuration data 136 may include audio data 132 stored in association with one or more elements of the rendered content 118 independent of user input. For example, a particular tone or series of tones may be used to indicate a content size 304 in the absence of user input. The configuration data 136 may be used to determine particular elements of rendered content 118 responsive to which audio feedback may be provided. The configuration data 136 may also be used to determine the particular sounds 110 that are provided responsive to determination of the particular elements of the rendered content 118. The configuration data 136 may further be used to determine audio characteristics 316 that may be used to modify audio data 132 responsive to determination of particular size characteristics 312 or feature characteristics 314. For example, based on the distance D between a feature 126 and a pointer 124 or other feature characteristics 314, such as the size or position of a feature 126, one or more of the frequency, amplitude, phase, or rate of repetition of a sound 110 may be modified by the audio generation module 130.

Block 804 presents rendered content 118 to a user device 104. As described previously, source content 122 may be received from a web server 120 or another source. A rendering engine 114 associated with the user device 104 may output rendered content 118. In some implementations, the rendered content 118 may be presented on a display device associated with the user device 104. In other implementations, use of a display device may be omitted, and the rendered content 118 may be rendered without being visibly presented to a user 102. For example, in the absence of a display device, the rendered content 118 may constitute a virtual user interface 202.

Block 806 determines one or more of a content type 302, a content size 304, or one or more features 126 associated with the rendered content 118. A feature determination module 128 may determine content types 302, content sizes 304, and features 126 based on a DOM tree or other metadata associated with rendered content 118. In other implementations, the feature determination module 128 may perform object recognition or text recognition on rendered content 118 to determine the presence of features 126 and the presence of one or more indicia, such as the visible appearance of a scroll bar 212 or an arrangement of one or more features 124, that may indicate the content type 302 or content size 304 associated with the rendered content 118.

Block 808 accesses audio data 132 corresponding to the determined content type(s) 302, content size(s) 304, or feature(s) 126. In some implementations, data corresponding to haptic output may also be accessed from the data store 116. For example, correspondence between at least a portion of the content types 302, content sizes 304, or features 126 of the configuration data 136 and the elements identified within the rendered content 118 by the feature determination module 128 may be determined by the audio generation module 130. Content types 302, content sizes 304, and features 126 of the configuration data 136 may have audio data 132 or data corresponding to haptic output associated therewith. The audio data 132 associated with the portions of the configuration data 136 that correspond to the rendered content 118 may be indicative of sounds 110 to be emitted responsive to particular content types 302, content sizes 304, or features 126. In some implementations, the audio data 132 may be modified using one or more audio characteristics 316. The audio characteristics 316 may be determined based on one or more size characteristics 312 or feature characteristics 314 determined by one or more of the feature determination module 128 or the audio generation module 130.

Block 810 provides the audio data 132 to an output device 108 to produce one or more sounds 110. The sounds 110, including any audio characteristics 316 that may be used to modify the audio data 132, may be used to indicate particular content types 302, particular content sizes 304, the presence of particular features 126, or feature characteristics 314 of the particular features 126. Responsive to the sounds 110, a user 102 may provide user input, such as to move a pointer 124 within the user interface 202 to interact with one or more of the features 126 for which a sound 110 was produced.

Figure 9:
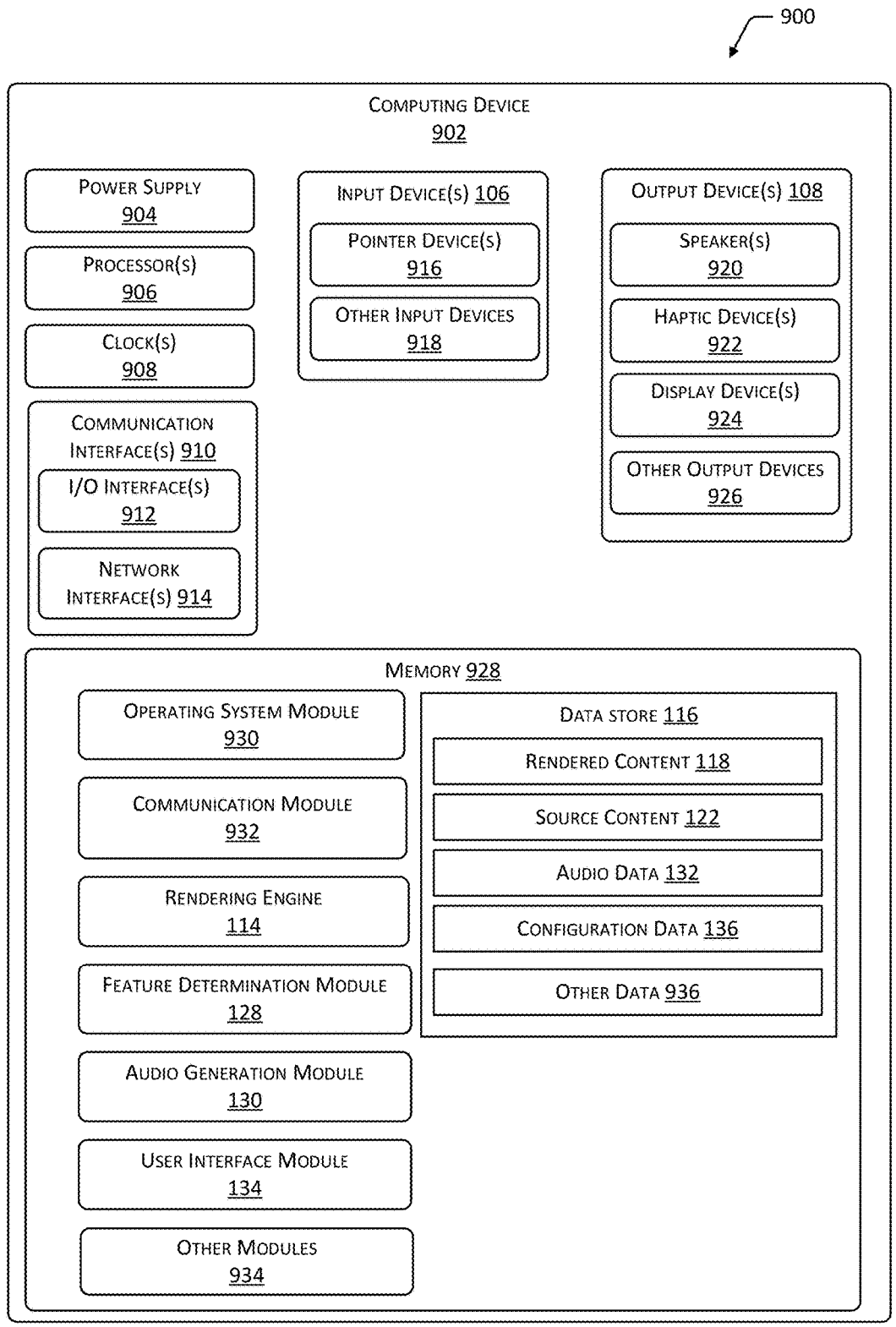
FIG. 9 is a block diagram illustrating a computing device within the scope of the present disclosure.

FIG. 9 is a block diagram 900 of a computing device 902 configured to support operation of the system 100. The computing device 902 may include one or more user devices 104, one or more servers, such as web servers 120, or one or more other computing devices 902 in communication with the user device(s) 104 or server(s). The computing device 902 may also include one or more CRSM accessible to any of the computing devices 902. In some implementations, the computing device 902 may include one or more input devices 106. For example, one or more modules, configuration data 136, audio data 132, and so forth, may be stored in association with a mouse device or another type of input device 106.

One or more power supplies 904 may be configured to provide electrical power suitable for operating the components of the computing device 902. In some implementations, the power supply 904 may include a rechargeable battery, fuel cell, photovoltaic cell, power conditioning circuitry, and so forth.

The computing device 902 may include one or more hardware processor(s) 906 (processors) configured to execute one or more stored instructions. The processor(s) 906 may include one or more cores. One or more clocks 908 may provide information indicative of date, time, ticks, and so forth. For example, the processor(s) 906 may use data from the clock 908 to generate a timestamp, trigger a preprogrammed action, and so forth. As another example, a clock 908 may be used to determine the rate of repetition associated with one or more sounds 110 or the passage of an interval of time between subsequent emissions of sound 110.

The computing device 902 may include one or more communication interfaces 910, such as input/output (I/O) interfaces 912, network interfaces 914, and so forth. The communication interfaces 910 may enable the computing device 902, or components of the computing device 902, to communicate with other computing devices 902 or components of the other computing devices 902. The I/O interfaces 912 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 912 may couple to one or more input devices 106 or one or more output devices 108. The input devices 106 and output devices 108 may include any manner of device able to be used in association with a user device 104, a server, or another computing device 902 in communication with a user device 104 or a server. For example, input devices 106 may include one or more pointer devices 916. Pointer devices 916 may include any device that may be used to produce a pointer 124 or otherwise indicate a particular point or set of points within a user interface 202. In some implementations, a pointer device 916 may produce a visible cursor within a display area 112. In other implementations, a pointer device 916 may be used to indicate or interact with a particular point or set of points within a user interface 202 without producing visible indicia. For example, pointer devices 916 may include mouse devices, trackballs, touchpads, touch sensors, joysticks, SNPs, head trackers, game controllers, and so forth. Other input devices 918 may include devices for providing input to a computing device 902 independent of a pointer 124. For example, other input devices 918 may include keyboards, buttons, microphones, scanners, cameras, other types of sensors, and so forth. Output devices 108 may include devices that may be used to provide visible, audible, or tactile indicia to a user 102. For example, output devices 108 may include one or more speakers 920, one or more haptic devices 922, or one or more display devices 924. Other output devices 926 may include one or more lights, printers, and so forth. Other output devices 926 may also include devices for providing other sensory stimuli to a user 102, such as air moving devices, temperature control devices, devices for outputting scents, and so forth. For example, a fan may be used as another output device 926 to blow air onto the user 102. In some implementations, input devices 106 or output devices 108 may be physically incorporated with the computing device 902 or may be externally placed.

The network interfaces 914 may be configured to provide communications between the computing device 902 and other devices, such as the input devices 106, output devices 108, routers, access points, and so forth. The network interfaces 914 may include devices configured to couple to one or more networks including local area networks (LANs), wireless LANs, wide area networks (WANs), wireless WANs, and so forth. For example, the network interfaces 914 may include devices compatible with Ethernet, Wi-Fi, Bluetooth, ZigBee, Z-Wave, 3G, 4G, LTE, and so forth.

The computing device 902 may include one or more busses or other internal communications hardware or software that allows for the transfer of data between the various modules and components of the computing device 902.

As shown in FIG. 9, the computing device 902 may include one or more memories 928. The memory 928 may include one or more CRSM. The CRSM may be any one or more of an electronic storage medium, a magnetic storage medium, an optical storage medium, a quantum storage medium, a mechanical computer storage medium, and so forth. The memory 928 may provide storage of computer-readable instructions, data structures, program modules, and other data for the operation of the computing device 902. A few example modules are shown stored in the memory 928, although the same functionality may alternatively be implemented in hardware, firmware, or as a system on a chip (SoC).

The memory 928 may include one or more operating system (OS) modules 930. The OS module 930 may be configured to manage hardware resource devices such as the I/O interfaces 912, the network interfaces 914, the input devices 106, the output devices 108, and to provide various services to applications or modules executing on the processors 906. The OS module 930 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 116 and one or more of the following modules may also be stored in the memory 928. The modules may be executed as foreground applications, background tasks, daemons, and so forth. The data store 116 may use a flat file, database, linked list, tree, executable code, script, or other data structure to store information. In some implementations, the data store 116 or a portion of the data store 116 may be distributed across one or more other devices including other computing devices 902, network attached storage devices, and so forth.

A communication module 932 may be configured to establish communications with one or more other computing devices 902, such as user devices 104, servers, such as web servers 120, storage media, or other computing devices 902 in communication therewith. The communications may be authenticated, encrypted, and so forth.

The memory 928 may store the rendering engine 114, which may be used to receive source content 122 and output rendered content 118. The rendering engine 114 may render the rendered content 118 for presentation. In some implementations, the rendered content 118 may be output using one or more output devices 108, such as a display device 924. In other implementations, content may be rendered to provide a virtual user interface 202 with which a user 102 may interact without necessarily providing the rendered content 118 to an output device 108. For example, sounds 110 may be produced responsive to features 126 determined from the rendered content 118 independent of whether the rendered content 118 is provided to an output device 108.

The memory 928 may also store the feature determination module 128. The feature determination module 128 may determine the presence of one or more features 126 within rendered content 118, the position of one or more features 126, and feature characteristics 314 associated with one or more features 126. For example, the feature determination module 128 may determine the type, size, and position of one or more features 126, such as buttons, links, menus, text boxes, text, graphic elements, and so forth. The feature determination module 128 may also determine the position of one or more edges of a display area 112 or of the rendered content 118. The feature determination module 128 may additionally determine the position 706 of the pointer 124 from the user interface module 134. The feature determination module 128 may further determine distances D between features 126, pointers 124, edges, and so forth, and the directions 606 in which elements are located relative to other elements. In some implementations, the feature determination module 128 may be configured to determine features 126 and feature characteristics 314 from a DOM tree or other data associated with rendered content 118. In other implementations, the feature determination module 128 may be configured to perform text, image, or object recognition or processing to determine the presence, position, or characteristics associated with one or more features 126. For example, image processing may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org.

In some implementations, one or more of the rendering engine 114 or the feature determination module 128 may be configured to determine whether at least a portion of the rendered content 118 includes secure content. For example, the rendering engine 114 may determine whether rendered content 118 is accessed via a secure connection. The rendering engine 114 may also determine whether the content type 302 includes content designated for special handling (such as financial information, medical information, or other types of confidential information). The feature determination module 128 may determine the presence of content designated for special handling or the secure connection, such as by accessing the DOM tree corresponding to the rendered content 118 or performing text or object recognition on the rendered content 118. Responsive to this determination, the audio generation module 130 may cause emission of an audible tone or another type of sound may be emitted to indicate the presence of secure content within the user interface 202.

The memory 928 may additionally store the audio generation module 130. The audio generation module 130 may access configuration data 136 to determine audio data 132 associated with the features 126 determined by the feature determination module 128. The audio generation module 130 may further determine audio characteristics 316 that may be used to modify the audio data 132 based on feature characteristics 314 determined by the feature determination module 128. The audio generation module 130 may access audio data 132 for output, based on the features 126 determined by the feature determination module 128. Based on determined audio characteristics 316, the audio generation module 130 may modify the audio data 132. In some implementations, the audio generation module 130 may provide the audio data 132, modified using determined audio characteristics 316, to one or more speakers 920. In other implementations, the audio data 132 may be prepared for presentation at a later time. For example, a webpage may be rendered, one or more features 126 within the webpage may be determined, and corresponding audio data 132 may be generated, independent of user input. The audio data 132 may subsequently be output at a later time when a user 102 accesses the webpage.

The memory 928 may further store the user interface module 134. The user interface module 134 may receive user input that may be stored as configuration data 136. A user 102 may select one or more types of content that may be of interest to the user 102, and one or more sounds 110 that may indicate selected types of content. A user 102 may select one or more ranges of content sizes 304 that may be of interest and one or more sounds 110 to indicate selected content sizes 304. A user 102 may also select one or more features 126 that may be of interest and one or more sounds 110 for use indicating selected features 126. In some implementations, the user 102 may further select characteristics of the features 126, such as the position of the features 126 within a user interface 202 (e.g., the section of a webpage where a feature 126 may be located), the distance or direction of a feature 126 relative to a pointer 124, the size, shape, or color of a feature 126, and so forth. The user 102 may also select audio characteristics 316 that may be used to indicate the feature characteristics 314. The user interface module 134 may receive and process each selection provided by a user 102 and generate configuration data 136 based on the user input. The user interface module 134 may also receive user input provided by the pointer devices 916 and maintain the position of a pointer 124, such as by storing coordinates indicative of the position of the pointer 124 within a user interface 202.

Other modules 934 may also be present in the memory 928. For example, audio processing modules may be used to receive recorded sounds 110 provided by a user 102 that may be subsequently used as audio data 132 for output. Compression and encryption modules may be used to encrypt, decrypt, compress, and decompress audio data 132 and rendered content 118 provided between computing devices 902 and modules.

Other modules 934 may also include text to speech modules or screen reading software, which may be used to output simulated speech using the one or more speakers 920 concurrently with the determination of features 126 within the rendered content 118 and the output of audio data 132. In some implementations, the audio data 132 may be provided in a manner that does not interfere with the simulated speech. For example, the sounds 110 may be provided at a volume less than that of the simulated speech. As another example, the sounds 110 may be suppressed or delayed responsive to a determination that the screen reading software is currently generating a large quantity of simulated speech or speech communicating critical information.

Other data 936 may include user preferences, such as configurations and settings associated with user devices 104, libraries and other resources for performing data processing, registration keys and other data that may be used to verify data provided between computing devices 902, and so forth.

In different implementations, different computing devices 902 may have different capabilities or capacities. For example, a web server 120 may have significantly more processor 906 capability and memory 928 capacity compared to the processor 906 capability and memory 928 capacity of a user device 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more display devices including a display area;
one or more input devices configured to provide input to move a pointer within at least a portion of the display area;
one or more speakers;

one or more memories storing computer-executable instructions; and
one or more hardware processors configured to execute the computer-executable instructions to:
  access configuration data including:
    a first sound associated with a category of a webpage;
    one or more second sounds associated with a length of the webpage, wherein the one or more second sounds include a first audio output associated with a top edge of the webpage and a second audio output associated with a bottom edge of the webpage, the second audio output being different than that first audio output;
    one or more third sounds associated with a feature of the webpage;
  display at least a portion of the webpage and the pointer within the display area;
  determine the category associated with the webpage;
  cause output of the first sound using at least one of the one or more speakers responsive to the determination of the category of the webpage;
  determine the length associated with the webpage, wherein the length is indicative of a physical distance from the top edge of the webpage to the bottom edge of the webpage;
  determine a first interval of time corresponding to the length;
  cause output of the first audio output using the at least one of the one or more speakers;
  determine passage of the first interval of time;
  cease output of the first audio output after the first interval of time;
  cause output of the second audio output using the at least one of the one or more speakers after the passage of the first interval of time;
  determine a first position of the feature within the webpage;
  determine a second position of the pointer relative to the first position of the feature;
  determine a first distance within the webpage between the first position of the feature and the second position of the pointer;
  cause output of the one or more third sounds using the at least one of the one or more speakers responsive to the determination of the first distance between the first position of the feature and the second position of the pointer;
  receive input from at least one of the one or more input devices corresponding to movement of the pointer;
  determine a third position of the pointer relative to the first position of the feature;
  determine a second distance within the webpage between the first position of the feature and the third position of the pointer; and
  cause output of the one or more third sounds using the at least one of the one or more speakers responsive to the determination of the second distance between the first position of the feature and the third position of the pointer.

2. The system of claim 1, wherein the one or more third sounds comprise a third audio output and a fourth audio output, and wherein the computer-executable instructions to cause output of the one or more third sounds further include computer-executable instructions to:
  determine a second interval of time corresponding to the second distance;
  cause output of the third audio output using the at least one of the one or more speakers;
  determine passage of the second interval of time;
  cease output of the third audio output after the second interval of time; and
  cause output of the fourth audio output using the at least one of the one or more speakers after the passage of the second interval of time.

3. The system of claim 1, wherein the one or more third sounds comprise a third audio output and a fourth audio output, and wherein the computer-executable instructions to cause output of the one or more third sounds further comprise computer-executable instructions to:
  determine a second interval of time corresponding to the first distance between the first position of the feature and the second position of the pointer;
  cause output of the third audio output using the at least one of the one or more speakers;
  determine passage of the second interval of time;
  cease output of the third audio output after the second interval of time; and
  cause output of the fourth audio output using the at least one of the one or more speakers after the passage of the second interval of time.

4. A method comprising:
  accessing configuration data including at least one sound associated with a user interface feature;
  rendering a user interface including the user interface feature;
  determining a first distance between a pointer associated with an input device and the user interface feature;
  determining a first interval of time corresponding to the first distance;
  generating first audio data corresponding to a first sound and second audio data corresponding to a second sound;
  outputting the first sound using an audio device;
  determining passage of the first interval of time;
  ceasing output of the first sound during the first interval of time;
  outputting the second sound using the audio device subsequent to the passage of the first interval of time, wherein a length of the first interval of time is indicative of the first distance between the pointer and the user interface feature;
  determining one or more third sounds associated with a length of a webpage, wherein the one or more third sounds include a third audio output associated with a top edge of the webpage and a fourth audio output associated with a bottom edge of the webpage, the third audio output being different than the fourth audio output;
  determining a length associated with the webpage, wherein the length is indicative of a physical distance from the top edge of the webpage to the bottom edge of the webpage;
  determining a second interval of time corresponding to the length;
  causing output of the third audio output using the audio device;
  determining passage of the second interval of time;
  ceasing output of the third audio output after the second interval of time; and
  causing output of the fourth audio output using the audio device after the passage of the second interval of time.

5. The method of claim 4, wherein the configuration data further includes a fifth sound associated with a content type, the method further comprising:
- receiving one or more of the fifth sound or an audio characteristic from a user device, wherein the one or more of the fifth sound or the audio characteristic is associated with the content type;
- determining the content type to be associated with the user interface; and
- one or more of outputting the fifth sound or providing one or more of the first sound or the second sound with the audio characteristic responsive to the determination of the content type.

6. The method of claim 4, further comprising:
- determining a direction of the user interface feature relative to the pointer;
- determining an audio characteristic associated with the direction; and
- modifying one or more of the first audio data or the second audio data with the audio characteristic.

7. The method of claim 4, further comprising:
- receiving input from the input device;
- moving the pointer relative to the user interface feature responsive to the input;
- determining that movement of the pointer exceeds a threshold quantity of movement;
- in response to the movement exceeding the threshold quantity of movement, determining a second distance between the pointer and the user interface feature;
- determining a third interval of time corresponding to the second distance;
- generating third audio data corresponding to a fifth sound and fourth audio data corresponding to a sixth sound;
- outputting the fifth sound;
- determining passage of the third interval of time; and
- outputting the sixth sound subsequent to the passage of the third interval of time.

8. The method of claim 4, further comprising:
- determining a tactile signal corresponding to one or more of the first distance or the user interface feature; and
- outputting the tactile signal to a haptic device.

9. The method of claim 4, further comprising:
- receiving input from the input device, the input indicative of a selection of content within the user interface;
- accessing the content responsive to the input from the input device;
- determining a failure to render the content;
- retaining the user interface for presentation; and
- outputting third audio data to the audio device to produce a notification sound responsive to the determination of the failure to render the content.

10. A system comprising:
- one or more memories storing computer-executable instructions; and
- one or more hardware processors configured to execute the computer-executable instructions to:
  - render content for presentation within a display area of a display device;
  - determine a top edge and a bottom edge of the content;
  - determine a first physical distance between the top edge and the bottom edge of the content;
  - access first audio data to determine one or more sounds that correspond to the first physical distance, wherein the one or more sounds include a first audio output associated with a top edge of a webpage and a second audio output associated with a bottom edge of the webpage, the second audio output being different than that first audio output;
  - determine a first interval of time corresponding to a length of the webpage;
  - cause output of the first audio output using an audio device;
  - determine passage of the first interval of time;
  - cease output of the first audio output after the first interval of time; and
  - cause output of a second audio output using the audio device after the passage of the first interval of time, wherein the passage of the first interval of time corresponds to the length.

11. The system of claim 10, further comprising computer-executable instructions to:
- determine a location of a feature within the content relative to at least a portion of the display area;
- access an audio characteristic corresponding to one or more of:
  - a second physical distance between the feature and the at least a portion of the display area; or
  - a direction of the feature relative to the at least a portion of the display area; and modify the first audio data with the audio characteristic.

12. The system of claim 10, further comprising computer-executable instructions to:
- receive configuration data from a user device, wherein the configuration data includes the one or more sounds that correspond to the first physical distance, and wherein the one or more sounds include non-speech audio output,
- wherein the computer-executable instructions to access the first audio data further include computer-executable instructions to access the configuration data.

13. The system of claim 10, further comprising computer-executable instructions to:
- determine a location of a feature within the content relative to at least a portion of the display area; and
- determine a second interval of time corresponding to a second physical distance between the feature and the at least a portion of the display area;
- access second audio data to determine one or more sounds that correspond to the second interval of time, wherein the one or more sounds include a third audio output associated with a position of the feature and a fourth audio output associated with the at least a portion of the display area, the fourth audio output being different than the third audio output;
- provide the second audio data to the audio device to produce the third audio output;
- determine passage of the second interval of time;
- cease output of the third audio output after the second interval of time; and
- provide the second audio data to the audio device to produce the fourth audio output subsequent to the passage of the second interval of time, wherein a length of the second interval of time is indicative of the second physical distance between the feature and the at least a portion of the display area.

14. The system of claim 10 further comprising computer-executable instructions to:
- determine a second interval of time corresponding to a second physical distance between a cursor and a feature of the webpage;
- access second audio data to determine one or more sounds that correspond to the second interval of time, wherein the one or more sounds include a third audio output associated with a position of the cursor and a fourth audio output associated with the feature of the webpage, the fourth audio output being different than the third audio output;
provide the second audio data to the audio device to produce the third audio output;
determine passage of the second interval of time;
cease output of the third audio output after the second interval of time; and
provide the second audio data to the audio device to produce the fourth audio output subsequent to the passage of the second interval of time, wherein a length of the second interval of time is indicative of the second physical distance between the cursor and the feature of the webpage.

15. The system of claim 10, further comprising computer-executable instructions to:
display a pointer associated with an input device within the display area;
output a portion of the content to the display device; and
position the pointer within a threshold distance of a feature of the content.

16. The system of claim 10, wherein the computer-executable instructions to provide the first audio data to the audio device further comprise computer-executable instructions to:
determine one or more of:
the output of at least a portion of the content to the display device; or
passage of the first interval of time;
wherein the first audio data is provided responsive to the one or more of the output of the at least a portion of the content or the passage of the first interval of time.

17. The system of claim 10, wherein the computer-executable instructions to provide the first audio data to the audio device further comprise computer-executable instructions to:
determine one or more of:
receipt of input from an input device indicative of a user request for audible output; or
movement of the content in the display area by a second distance greater than or equal to a threshold distance;
wherein the first audio data is provided responsive to the one or more of the receipt of the input or the movement of the content in the display area.

18. The system of claim 10, further comprising computer-executable instructions to:
determine text within at least a portion of the content;
generate speech data indicative of speech corresponding to the text; and
provide the speech data to the audio device to produce the speech corresponding to the text at a first volume; and
modify the speech to produce the one or more sounds at a second volume less than the first volume.

19. The system of claim 1, further comprising computer-executable instructions to:
determine that the movement of the pointer exceeds a threshold distance, where in the one or more third sounds are output in response to the movement exceeding the threshold distance.

20. The method of claim 4, further comprising:
determining a second physical distance between a top edge of the user interface and a bottom edge of the user interface;
determining a second interval of time corresponding to the second physical distance;
outputting a third sound;
determining passage of the second interval of time; and
outputting a fourth sound subsequent to the passage of the second interval of time, wherein a length of the second interval of time is indicative of the second physical distance.

* * * * *

UNITED STATES PATENT AND TRADEMARK OFFICE
CERTIFICATE OF CORRECTION

PATENT NO. : 10,402,159 B1
APPLICATION NO. : 14/657056
DATED : September 3, 2019
INVENTOR(S) : Darrah et al.

Page 1 of 1

It is certified that error appears in the above-identified patent and that said Letters Patent is hereby corrected as shown below:

In the Claims

Column 34, Line 60:
Reads "The system of claim 10 further comprising"
When it should read -- The system of claim 10, further comprising --

Column 36, Line 21:
Reads "threshold distance, where in the one or more third"
When it should read -- threshold distance, wherein the one or more third --

Signed and Sealed this
Twelfth Day of November, 2019

Andrei Iancu
*Director of the United States Patent and Trademark Office*